(12) United States Patent
Dow

(10) Patent No.: US 12,416,504 B2
(45) Date of Patent: Sep. 16, 2025

(54) METHOD AND APPARATUS FOR CHARGING/DISCHARGING ELECTRIC VEHICLE

(71) Applicant: HYUNDAI MOBIS CO., LTD., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 213 days.

(21) Appl. No.: 17/994,727

(22) Filed: Nov. 28, 2022

(65) Prior Publication Data
US 2023/0408273 A1    Dec. 21, 2023

(30) Foreign Application Priority Data
Jun. 15, 2022 (KR) .......................... 10-2022-0072696

(51) Int. Cl.
| | | |
|---|---|---|
| G01C 21/34 | (2006.01) | |
| B60L 53/62 | (2019.01) | |
| G06Q 30/0283 | (2023.01) | |
| G06Q 50/06 | (2024.01) | |
| H02J 3/32 | (2006.01) | |
| H02J 7/00 | (2006.01) | |

(52) U.S. Cl.
CPC ......... *G01C 21/3476* (2013.01); *B60L 53/62* (2019.02); *G06Q 30/0283* (2013.01); *G06Q 50/06* (2013.01); *H02J 3/322* (2020.01); *H02J 7/0047* (2013.01); *H02J 7/0071* (2020.01)

(58) Field of Classification Search
None
See application file for complete search history.

(56) References Cited

U.S. PATENT DOCUMENTS

| | | |
|---|---|---|
| 2009/0222143 A1 | 9/2009 | Kempton |
| 2011/0202192 A1 | 8/2011 | Kempton |
| 2013/0038283 A1* | 2/2013 | Acena ................... H02J 7/1423 |
| | | 320/109 |

(Continued)

FOREIGN PATENT DOCUMENTS

EP    4 005 861 A1    6/2022

OTHER PUBLICATIONS

Extended European Search Report issued on Jun. 1, 2023, in counterpart European Patent Application No. 22210471.3 (26 pages in English).

*Primary Examiner* — James J Lee
*Assistant Examiner* — Melanie G Huber
(74) *Attorney, Agent, or Firm* — NSIP Law

(57) ABSTRACT

A method for charging/discharging an electric vehicle includes generating map information including a charging/discharging fee rate policy for mapped charging stations and registering the generated map information in a vehicle, identifying one or more charging stations capable of performing a charging/discharging of the vehicle based on the generated map information, selecting an optimal charging station for the charging/discharging among the identified charging stations, determining a charging/discharging schedule based on a charging/discharging fee rate policy of the selected charging station, and performing the charging/discharging based on the determined charging/discharging schedule at the selected charging station.

19 Claims, 17 Drawing Sheets

(56) References Cited

U.S. PATENT DOCUMENTS

| | | | |
|---|---|---|---|
| 2014/0159658 A1* | 6/2014 | Kiceniuk, Jr. | B60L 53/14 320/155 |
| 2015/0061592 A1* | 3/2015 | Nakasone | B60L 53/14 320/109 |
| 2015/0142238 A1* | 5/2015 | Sako | B60L 53/51 701/22 |
| 2015/0283912 A1* | 10/2015 | Shimizu | B60L 55/00 320/157 |
| 2017/0028853 A1* | 2/2017 | Elshaer | B60L 53/68 |
| 2018/0111494 A1 | 4/2018 | Penilla et al. | |
| 2018/0307226 A1* | 10/2018 | Chase | G05D 1/0027 |
| 2018/0312072 A1* | 11/2018 | Yang | B60L 55/00 |
| 2018/0337548 A1* | 11/2018 | Beaver | H02J 50/12 |
| 2020/0376972 A1* | 12/2020 | Martin | B60L 53/57 |
| 2021/0046843 A1* | 2/2021 | Maeda | G01C 21/3469 |
| 2021/0086647 A1* | 3/2021 | Kiessling | B60L 53/67 |
| 2022/0048399 A1* | 2/2022 | Nishita | G05B 19/042 |

* cited by examiner

FIG.12

AUSTRIA (AREA CODE: 0x17) — 1200

| TIME | 0-2 | 2-4 | 4-6 | 6-8 | 8-10 | 10-12 | 12-14 | 14-16 | 16-18 | 18-20 | 20-22 | 22-24 |
|---|---|---|---|---|---|---|---|---|---|---|---|---|
| POWER GRID 1 (CODE: 0x2A) | 0.1 | 0.1 | 0.15 | 0.2 | 0.2 | 0.3 | 0.3 | 0.2 | 0.2 | 0.15 | 0.15 | 0.1 |
| POWER GRID 2 (CODE: 0x2B) | 0.09 | 0.11 | 0.12 | 0.25 | 0.21 | 0.25 | 0.25 | 0.21 | 0.21 | 0.15 | 0.15 | 0.1 |
| POWER GRID 3 (CODE: 0x2C) | 0.09 | 0.09 | 0.16 | 0.24 | 0.2 | 0.31 | 0.31 | 0.2 | 0.21 | 0.14 | 0.14 | 0.09 |
| MODE | CHARGING | CHARGING | | | | DISCHARGING (START) | DISCHARGING | | | CHARGING (START) | CHARGING | CHARGING |
| DISCHARGING FLAG | | | | | | 1 | 1 | | | | | |
| CHARGING FLAG | 1 | 0 | | | | | | | | 1 | 1 | 1 |
| DEPOSIT AND WITHDRAWAL STATE | FEE WITHDRAWN (22-24) | FEE WITHDRAWN (0-2) | | | | | FEE DEPOSITED (10-12) | NOT DEPOSITED (12-14) | | | FEE WITHDRAWN (18-20) | FEE WITHDRAWN (20-22) |

1201 — POWER GRID rows; 1202 — MODE; 1203 — DISCHARGING FLAG; 1204 — CHARGING FLAG; 1205 — DEPOSIT AND WITHDRAWAL STATE

FIG.13

AUSTRIA (AREA CODE: 0x17, POWER GRID CODE: 0x2C)

| TIME | 0-2 | 2-4 | 4-6 | 6-8 | 8-10 | 10-12 | 12-14 | 14-16 | 16-18 | 18-20 | 20-22 | 22-24 |
|---|---|---|---|---|---|---|---|---|---|---|---|---|
| CHARGING STATION 1 (CODE: 0x3A) | 0.1 | 0.1 | 0.15 | 0.2 | 0.2 | 0.3 | 0.3 | 0.2 | 0.2 | 0.15 | 0.15 | 0.1 |
| CHARGING STATION 2 (CODE: 0x3B) | 0.09 | 0.11 | 0.12 | 0.25 | 0.21 | 0.25 | 0.25 | 0.21 | 0.21 | 0.15 | 0.15 | 0.1 |
| CHARGING STATION 3 (CODE: 0x3C) | 0.09 | 0.10 | 0.16 | 0.24 | 0.2 | 0.31 | 0.30 | 0.2 | 0.21 | 0.14 | 0.13 | 0.09 |
| MODE | CHARGING | CHARGING | | | | DISCHARGING (START) | DISCHARGING | | | CHARGING (START) | CHARGING | CHARGING |
| DISCHARGING FLAG | | | | | | 1 | 1 | | | | | |
| CHARGING FLAG | 1 | 1 | | | | | | | | 1 | 1 | 1 |
| DEPOSIT AND WITHDRAWAL STATE | FEE WITHDRAWN | FEE WITHDRAWN | FEE NOT WITHDRAWN | | | | FEE DEPOSITED | FEE NOT DEPOSITED | | | FEE DEPOSITED | FEE DEPOSITED |

1300

1301 1302 1303 1304 1305

METHOD AND APPARATUS FOR CHARGING/DISCHARGING ELECTRIC VEHICLE

This application claims the benefit under 35 USC § 119(a) of Korean Patent Application No. 10-2022-0072696, filed on Jun. 15, 2022, the entire disclosure of which is incorporated herein by reference for all purposes.

BACKGROUND

Field

The present disclosure relates to a charging/discharging technology for an electric vehicle, and specifically, to a charging/discharging control technology for power system protection and cost-effective charging/discharging in a vehicle to grid (V2G) system.

Description of the Related Art

A representative eco-friendly technology required for vehicle operation is to replace an internal combustion engine that uses a fossil fuel. This means that a vehicle using the internal combustion engine will be replaced by an electric vehicle. Because the electric vehicle (EV) drives an electric motor using a battery, the use of the internal combustion engine may be avoided to some degree or completely, so that environmental pollution and a dependence on consumption of the fossil fuel may be significantly reduced. Currently, the electric vehicle is being commercialized in a hybrid scheme (a plug-in hybrid electric vehicle (PHEV)) of being driven by the internal combustion engine, the electric motor, and the battery, and a scheme (a battery electric vehicle (BEV)) of being driven only by the battery and the electric motor.

Plug and charging is a technical concept first introduced in ISO 15118, an international standard for charging the electric vehicle. A forward-looking concept of the corresponding standard may enable a user to more conveniently and safely charge the EV and may be used at any charge point that fully supports the corresponding standard.

The only action required by a driver is to connect a charging cable to the EV and/or a charging station. When the charging cable is connected thereto, the EV is automatically authorized to identify itself to the charge point on behalf of the driver and receive energy for charging the battery.

Recently, the charging of the electric vehicle has been actively researched not only on a wired charging scheme via the charging cable, but also on a wireless charging scheme of receiving power wirelessly and charging the electric vehicle.

Therefore, future plug and charging is expected to be applicable not only to conventional wired charging—for example, including AC charging using an AC low-speed charger and DC charging using a DC high-speed charger-, but also to wireless charging, such as an electromagnetic induction scheme or a magnetic resonance scheme.

In the future, the plug and charging is expected to be applied not only to the electric vehicle, but also to various motor-driven transportation means such as a commercial drone, an electric bus, an electric kickboard, a personal mobility such as an electric bicycle, an amphibious vehicle, and an urban air mobility (UAM), which is a vertical take-off and landing electric plane.

A concept of the urban air mobility (UAM) was first defined by the national aeronautics and space administration (NASA) as "safe and efficient air traffic operation in a metropolitan area for manned and unmanned aerial vehicle systems". A recent increase in interest in the UAM by governments, businesses, and research institutions has led to rapid proliferation of this new concept.

According to a market report by Global Information, Inc., a market size of the urban air mobility (UAM) is expected to grow from $2.6 billion in 2020 to $9.1 billion in 2030 by expanding at a compound annual growth rate (CAGR) of 13.5%. Factors such as improved efficiency, safety for people, and increased investment demand are expected to drive the market growth.

The UAM is expected to revolutionize conventional modes of transport, including a highway, a railroad, an airway, and a waterway. A 2018 Morgan Stanley blue paper estimates that a global UAM addressable market will reach $1.5 trillion by 2040.

The UAM concept may be further extended to an application in a rural area where conventional ground transport infrastructure is insufficient. In particular, in addition to the transport sector, the UAM vehicle is expected to be applied in a specific scenario such as a tourism, an industry, an emergency medical service, and a fire control.

In the future, a smart UAM vehicle may have an autonomous driving function and a remote control function to eliminate a need for a pilot on board. This may not only eliminate a need for the in-vehicle pilot and a related cost, but also prevent a risk of a safety accident caused by a human error, and make it easier and safer to control the vehicle on the ground.

The UAM vehicle is a flying vehicle that transports passengers or cargo on a specific point-to-point route within an urban area. Unlike an aircraft that uses a conventional runway because of constraints of buildings, factories, road traffic, and city crowds, an ideal vehicle model should be autonomous, compact, efficient, agile, and maneuverable, along with the ability to take off and land vertically.

In addition, an electrically driven UAM vehicle is environmentally friendly and does not emit exhaust gas at all using eco-friendly energy such as solar power, electric energy, and hydrogen fuel instead of the conventional fossil fuel in consideration of atmospheric environmental issues or the like.

The UAM vehicle has an advantage of being faster and more efficient than the conventional ground transportation in that individuals and the cargo may move between cities on a straight air route.

A centralized UAM platform provides a convenient network, eliminating a need for the individuals to own their own UAM vehicles. This may not only increase asset utilization, but also reduce wastage of resources.

In addition, the centralized UAM platform is able to eliminate a parking problem that dominates many parts of city life today, and has an advantage of realizing a true sharing economy compared to the conventional vehicle.

The UAM may provide a short-haul (3 km-100 km) air service and may be designed for a city dweller to effectively solve the "last 50 km" problem that airlines are currently not able to solve.

In order to efficiently operate the electric vehicle, a safe and efficient charging/discharging scheme is desired.

In particular, in consideration of regional differences in system parameters and fee rate policies, efficiently controlling the charging/discharging of the electric vehicle is desired for cost-effective management as well as for securing safety of the electric vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a method including generating map information including a charging/discharging fee rate policy for mapped charging stations and registering the generated map information in a vehicle, identifying one or more charging stations capable of performing a charging/discharging of the vehicle based on the map information, selecting an optimal charging station for the charging/discharging among the identified charging stations, determining a charging/discharging schedule based on a charging/discharging fee rate policy of the selected charging station, and performing the charging/discharging based on the determined charging/discharging schedule at the selected charging station.

The selecting of the optimal charging station may include determining an available charging/discharging time period and determining a charging station leading to an optimal fee based on a charging/discharging fee rate of each of the identified charging stations of the determined available charging/discharging time period.

The method may also include receiving system parameters corresponding to an area code corresponding to the current location, and correcting the received system parameters based on a measurement result for a power signal received from the selected charging station, and the system parameters may be received from a server connected via the selected charging station or a network.

The system parameters may include an operating frequency value and an active power value, the operating frequency value may be corrected by comparing a received operating frequency value with a measured operating frequency value measured from the power signal, and the active power value may be corrected by comparing a received active power value with a measured active power value measured from the power signal.

The determining of the charging/discharging schedule may include determining a discharging time period leading to a maximum fee based on the charging/discharging fee rate policy of the selected charging station, determining a charging time period leading to a minimum fee based on the charging/discharging fee rate policy of the selected charging station, and generating a charging/discharging scheduling table based on the determined discharging time period and the determined charging time period.

The charging/discharging fee rate policy may be dynamically updated based on power consumption statistics information for the determined charging time period and the determined discharging time period of the selected charging station.

The charging/discharging scheduling table may include one or more of a fee rate field indicating a fee rate for each time period, a mode field indicating a time period to be in a discharging mode, a discharging start time period, a time period to be in a charging mode, and a charging start time period, a charging/discharging flag field indicating whether actual discharging or charging has been performed in a corresponding time period, and a deposit and withdrawal state field indicating whether deposit or withdrawal of a fee to or from a user account has been completed for the discharging or the charging performed in the corresponding time period.

The determining of the charging/discharging schedule may further include basing the determined charging/discharging schedule on one or more of a future travel plan set by a user, a pre-analyzed travel pattern, and a current battery charged state.

The method may also include transmitting vehicle state information to a server via a network and receiving the pre-analyzed travel pattern from the server. The pre-analyzed travel pattern may be determined by the server, in advance, based on the vehicle state information.

The vehicle state information may include one or more of location information of the vehicle, information on a travel path set in a navigation system, information on the current battery charged state, information on a travel speed, information on a road where the vehicle is traveling, information on battery power consumed per unit time, and information on preferred power grid and charging station of the user.

In another general aspect, here is provided a machine-readable storage medium, including executable instructions, that, when executed by a processing system including a processor, facilitate performance of operations that include generating map information including a charging/discharging fee rate policy for each mapped charging station and registering the generated map information in a vehicle, identifying one or more charging stations capable of performing charging/discharging operations corresponding to a current location of the vehicle based on the map information, selecting an optimal charging station for charging/discharging of the vehicle among the identified charging stations, determining a charging/discharging schedule based on a charging/discharging fee rate policy of the optimal charging station, and performing the charging/discharging based on the determined charging/discharging schedule at the selected charging station.

In another general aspect, here is provided an electric vehicle that includes a battery, a positioning system for measuring a current location, a vehicle communication terminal in communication with an external device via a network, an electric vehicle charging controller configured to control a charging and a discharging of the battery, and a charging/discharging device for the charging or the discharging the battery in association with a charging station, the charging/discharging device being controlled by the electric vehicle charging controller and the electric vehicle charging controller is configured to perform operations that include generating map information including a charging/discharging fee rate policy for mapped charging stations, registering the generated map information in a navigation system, identifying one or more charging stations capable of performing the charging or the discharging corresponding to the current location of the electric vehicle based on the generated map information, selecting an optimal charging station for the charging or the discharging among the identified charging stations, determining a charging/discharging schedule based on a charging/discharging fee rate policy of the selected charging station, and performing the charging or discharging at the selected charging station based on the charging/discharging schedule.

The operations further may also include determining an available charging/discharging time period and determining a charging station leading to an optimal fee based on a charging/discharging fee rate of each of the identified charging stations of the available charging/discharging time period.

The operations may further include receiving system parameters corresponding to an area code corresponding to the current location and correcting the system parameters based on a measurement result for a power signal received from the selected charging station, and the system parameters may be received from a server connected via the selected charging station or a network.

The system parameters may include an operating frequency value and an active power value, and the operations may also include correcting the operating frequency value by comparing a received operating frequency value with a measured operating frequency value measured from the power signal and correcting the active power value by comparing a received active power value with a measured active power value measured from the power signal.

The operations may also include determining a discharging time period leading to a maximum fee based on the charging/discharging fee rate policy of the selected charging station, determining a charging time period leading to a minimum fee based on the charging/discharging fee rate policy of the selected charging station, and generating a charging/discharging scheduling table based on the determined discharging time period and the determined charging time period.

The charging/discharging scheduling table can include one or more of a fee rate field indicating a fee rate for each time period, a mode field indicating a time period to be in a discharging mode, a discharging start time period, a time period to be in a charging mode, and a charging start time period, a charging/discharging flag field indicating whether an actual discharging or an actual charging has been performed in a corresponding time period, and a deposit and withdrawal state field indicating whether deposit or withdrawal of a fee to or from a user account has been completed for the actual discharging or the actual charging performed in the corresponding time period.

The determining the charging/discharging schedule also may include basing the determining on one or more of a future travel plan set by a user, a pre-analyzed travel pattern, and a current battery charged state.

The operations may also include transmitting vehicle state information to a server via the vehicle communication terminal and receiving the pre-analyzed travel pattern from the server, wherein the server learns the pre-analyzed travel pattern in advance based on the vehicle state information, and the vehicle state information may include one or more of location information of the electric vehicle, information on a travel path set in the navigation system, information on the current battery charged state, information on a travel speed, information on a road where the electric vehicle is traveling, information on battery power consumed per unit time, and information on a preferred power grid and/or a preferred charging station of the user.

The charging/discharging fee rate policy may be dynamically updated based on power consumption statistics information for the determined charging time period and the determined discharging time period of the selected charging station.

BRIEF DESCRIPTION OF THE DRAWINGS

FIG. 12 shows a charging/discharging scheduling table based on a charging/discharging fee rate policy corresponding to a power grid code according to an embodiment of the present disclosure.

FIG. 13 shows a charging/discharging scheduling table based on a charging/discharging fee rate policy corresponding to a charging station identification code according to an embodiment of the present disclosure.

FIG. 14 is a flowchart for illustrating a charging/discharging scheduling method for an electric vehicle according to an embodiment of the present disclosure.

Figure 1:
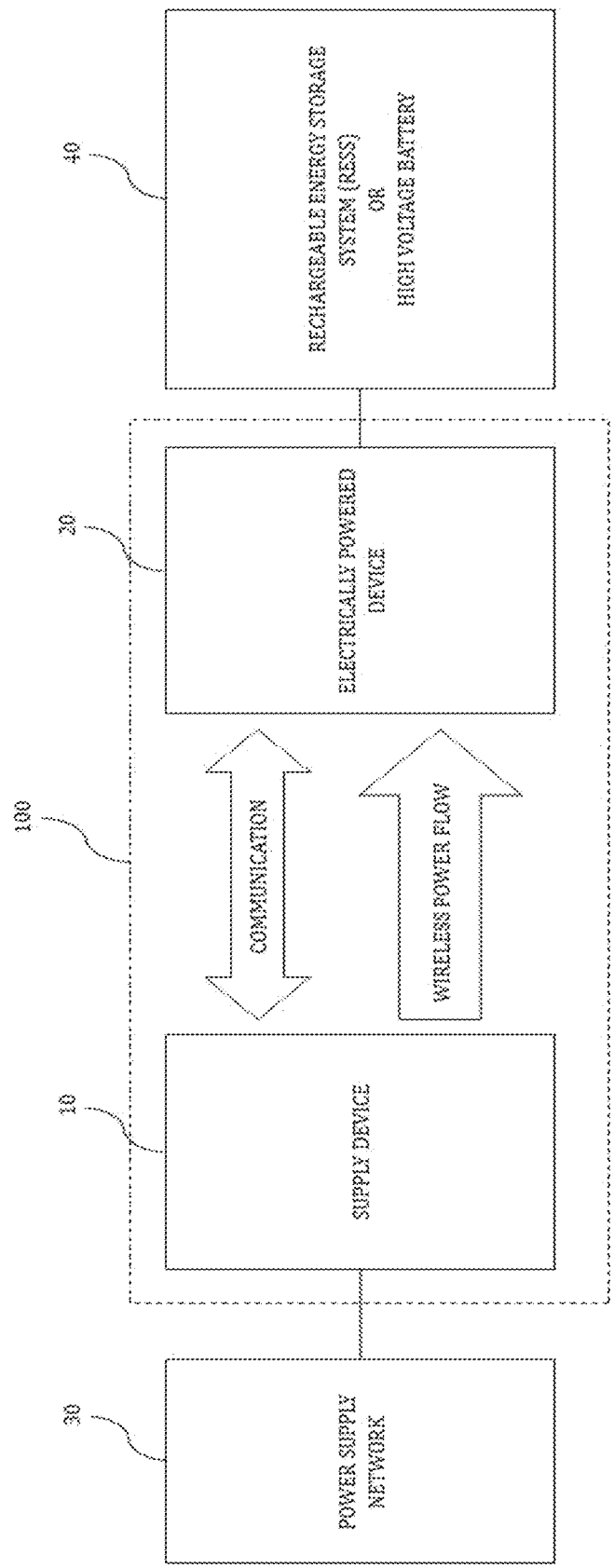
FIG. 1 is a diagram for illustrating an overall structure of a wireless power transmission system according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.\

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present disclosure will be described in detail with reference to FIGS. 1 to 17.

FIG. 1 is a diagram for illustrating an overall structure of a wireless power transmission system according to an embodiment.

Referring to FIG. 1, a wireless power transmission system 100 may be roughly composed of a supply device 10 and an electrically powered device 20.

After converting AC (or DC) electrical energy supplied from a power supply network 30 into AC electrical energy required by the electrically powered device 20, the supply device 10 may transmit the converted AC electrical energy to the electrically powered device 20 via a predetermined wireless energy transmission scheme. In this regard, the wireless energy transmission schemes may include an electromagnetic induction scheme, an electromagnetic resonance schemes (or a magnetic resonance schemes), a microwave scheme, an RF wireless power transmission scheme, and the like. The electromagnetic induction scheme is a scheme for transmitting energy using an induced electromotive force generated using a magnetic induction phenomenon for alternating current between a primary coil disposed in the supply device 10 and a secondary coil disposed in the electrically powered device 20. On the other hand, the electromagnetic resonance scheme is a scheme in which, when the supply device 10 generates a magnetic field that vibrates at a specific resonant frequency via the primary coil equipped therein, the electrically powered device 20 transmits energy via a process of inducing a magnetic field to the secondary coil having the same resonant frequency. The RF wireless power transmission scheme is a scheme of beamforming an RF wireless power signal using a phased array antenna system of a transmitter and transmitting the RF wireless power signal to a receiver, and has an advantage of long-distance wireless charging up to a radius of several m compared to the conventional electromagnetic induction scheme or the electromagnetic resonance scheme.

The supply device 10 and the electrically powered device 20 may be connected to each other via short-range wireless communication to exchange various information for wireless power transmission.

After rectifying the wireless power received from the supply device 10, the electrically powered device 20 may supply the rectified power to an in-device-that is, on-board-rechargeable energy storage system (RESS) or high voltage (HV) battery.

The supply device 10 according to an embodiment may be installed in a building, on a road, in a parking lot, in a charging hub, and in a vertiport or the like located on land, in the air, on water or on a roof of a building, or the like as an infrastructure for taking off and landing of an urban air mobility. When a wireless power transmission pad for the wireless power transmission is mounted on the electrically powered device 20, the electrically powered device 20 may function as a supply device. Therefore, wireless charging between the electrically powered devices 20 and wireless discharging from the electrically powered device 20 to the supply device 10 may be performed.

As an example, when a plurality of wireless power reception pads are mounted on the electrically powered device 20, the electrically powered device 20 may simultaneously receive the wireless power from at least one other electrically powered device 20 equipped with the wireless power transmission pad to charge a battery equipped therein.

As another example, when a plurality of wireless power transmission pads are mounted on the electrically powered device 20, the electrically powered device 20 may charge at least one other electrically powered device 20 by transmitting the wireless power to the at least one other electrically powered device 20 equipped with the wireless power reception pad. That is, when not being able to move to the supply device 10 based on state information such as a current battery residual quantity and the like, the electrically powered device 20 may perform the charging between the electrically powered devices 20 in association with another electrically powered device 20 adjacent thereto. For example, an electrically powered device for supplying the wireless power and an electrically powered device for receiving the wireless power may be dynamically determined based on the current battery residual quantity of the electrically powered device 20.

The electrically powered device 20 according to an embodiment may be mounted on various means of transportation. As an example, the electrically powered device 20 may be applied to an electric vehicle, a personal mobility, an unmanned drone, an urban air mobility, a multi-modal mobility (or a hybrid air mobility) operating on land and in air or on land and on sea.

In a following embodiment, the electrically powered device 20 will be described as being mounted on the urban air mobility as an example.

The electrically powered device 20 according to an embodiment may be mounted at one side of a lower portion of the urban air mobility, but this is only one embodiment. Based on a design of those skilled in the art, the electrically powered device may be mounted at one side of an upper portion, of a front portion, of a rear portion, and of a left/right portion of the urban air mobility.

The supply device 10 according to an embodiment may be in association with another supply device 10 via a wired or wireless communication system.

The electrically powered device 20 according to an embodiment may be in association with another electrically powered device 20 via the wireless communication system. To this end, the electrically powered device 20 may be connected, via an internal communication network of the electric vehicle, to a wireless communication terminal (not shown) mounted on the corresponding electric vehicle to exchange signals and information.

For example, the wireless communication system may be a multiple access system that supports communication with multiple users by sharing available system resources (e.g., a bandwidth, transmission power, and the like). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, and the like, but may not be limited thereto and include a Wi-Fi communication system, a 4G long term evolution (LTE) communication system, a 5G new radio (NR) communication system, a satellite communication system, an IEEE 802.11p-based wireless access for vehicle environment (WAVE) communication system, and the like.

The electrically powered device 20 according to an embodiment may be connected to at least one other supply device via the wireless communication. For example, the electrically powered device 20 may be simultaneously connected to a plurality of supply devices 10. In this case, the electrically powered device 20 may be rapidly charged by simultaneously receiving the wireless power from the plurality of supply devices 10. For example, based on an efficiency of the wireless charging between the electrically powered device 20 and the supply device 10, the electrically powered device 20 may dynamically determine at least one supply device 10 from which the power is to be transmitted. As another example, based on the efficiency of the wireless charging between the electrically powered device 20 and the supply device 10, the supply device 10 may dynamically determine and schedule at least one electrically powered device 20 to which the wireless power is to be transmitted.

In the above-described embodiment, it is described that the supply device 10 and the electrically powered device 20 to perform the wireless charging are dynamically determined based on the wireless charging efficiency, but this is only one embodiment. The supply device 10 and the electrically powered device 20 to perform the wireless charging may be dynamically determined by further considering a type and a capability of the supply device 10, a type and a capability of the electrically powered device 20, and the like. For example, the type and the capability of the electrically powered device 20 may be different depending on a type of the means of transportation on which the electrically powered device is mounted. Accordingly, the type and the capability of the supply device 10 matching the corresponding electrically powered device 20 may also be different.

The electrically powered device 20 according to an embodiment may perform a function as a wireless power transmission relay-hereinafter, for convenience of illustration, referred to as a relay or a relay node—that transmits the power received from the supply device 10 to another electrically powered device. In this case, the electrically powered device 20 may be equipped with both a wireless power receiver (or the wireless power reception pad) for receiving the wireless power and a wireless power transmitter (the wireless power transmission pad) for transmitting the wireless power. As an embodiment, locations where the wireless power receiver and the wireless power transmitter are mounted within one urban air mobility may be different from each other, but this is only one embodiment. The wireless power receiver and the wireless power transmitter may be constructed as one module and mounted at a specific location. As an example, the wireless power reception pad for receiving the power from the supply device 10 may be mounted at one side of the lower portion of the urban air mobility, and the wireless power transmission/reception pad for receiving the wireless power from another urban air mobility or transmitting the wireless power to another urban air mobility may be mounted at one side of the upper portion of the urban air mobility.

According to the above-described embodiments, the urban air mobility equipped with the electrically powered device 20 according to the present disclosure may not only receive the wireless power from the supply device 10 to charge the battery thereof, but also transmit and receive the wireless power via collaboration with a stopped (or flying) urban air mobility. For example, when the current battery residual quantity is not sufficient to fly up to the nearest supply device 10 during flight or when the urban air mobility deviates from a route due to extreme weather or the like, the corresponding urban air mobility may make a request for emergency air charging to another urban air mobility (or a central control center) nearby.

As an example, when being capable of performing the emergency air charging based on a charged state of the battery thereof, said another urban air mobility nearby that has received the request for the emergency air charging may move to the urban air mobility, which has requested the emergency air charging, to provide the wireless power via the wireless charging during the flight.

As another example, the central control center (or an urban air mobility (UAM) air operator) that has received the request for the emergency air charging may search for another urban air mobility around the urban air mobility that has requested the emergency air charging, and determine a target to participate in the emergency air charging based on a current battery charged state of the searched another urban air mobility. When the target to participate in the emergency air charging is determined, the central control center may transmit a predetermined control signal to the surrounding urban air mobility determined to be the target to participate in the emergency air charging so as to guide the surrounding urban air mobility to a location of the urban air mobility that has requested the emergency air charging, and then control the surrounding urban air mobility to perform the wireless charging during flight.

The electrically powered device 20 may control at least one switch disposed on the wireless power transmission pad and the wireless power reception pad to ON/OFF operations of the corresponding wireless power transmission pad and/or wireless power reception pad.

In the above embodiment, the description has been made that the electrically powered device 20 receives the wireless power from one supply device 10 as an example, but this is only one embodiment. The electrically powered device 20 may be equipped with the plurality of wireless power reception pads to simultaneously receive the wireless power from the plurality of supply devices 10 so as to be charged at a high speed.

In another embodiment, the electrically powered device 20 may further include wired charging means as well as wireless charging means. In this case, the high-speed charging may be performed using at least one of the wireless charging means and the wired charging means.

An electrically powered device 20 of a first urban air mobility according to an embodiment may divide the wireless power received from the supply device 10 via negotiation with an electrically powered device 20 equipped in a second urban air mobility and transmit a portion of the wireless power to the second urban air mobility. As an example, amounts of power charged by the first urban air mobility and the second urban air mobility may be dynamically determined based on a battery charged state of each urban air mobility. As another example, the amounts of power charged by the first urban air mobility and the second urban air mobility may be dynamically determined based on a flight reservation state as well as the battery charged state of each of the first urban air mobility and the second urban air mobility. That is, because the longer the reserved flight distance corresponding to each urban air mobility, the more power consumption is expected, it is necessary to further consider a flight plan, a flight distance, and the like for the power distribution.

The electrically powered device 20 according to an embodiment may determine whether power relay to another urban air mobility is possible based on a battery charged state of the RESS 40 thereof. As an example, when a remaining battery level (or a battery output voltage) of the first urban air mobility is equal to or higher than a predetermined reference value, the electrically powered device 20 of the first urban air mobility may transmit the power received from the supply device 10 to the electrically powered device 20 of the second urban air mobility. On the other hand, when the remaining battery level (or the battery output voltage) of the first urban air mobility is lower than the predetermined reference value, the electrically powered device 20 of the first urban air mobility may control the power received from the supply device 10 to be used only for charging the RESS 40 thereof without being relayed to the electrically powered device 20 of the second urban air mobility.

The communication terminal mounted on the urban air mobility may be connected to the supply device 10, another urban air mobility, the central control center, and the like via vehicle to everything (V2X) communication supported by 4G LTE/5G NR communication so as to exchange various information.

The urban air mobility may be equipped with a global positioning system (GPS) receiver to receive and decode a GPS satellite signal. The urban air mobility may obtain current GPS coordinate information from the GPS satellite signal and provide the current GPS coordinate information to the supply device 10 and/or another urban air mobility via the communication terminal. In one example, the communication terminal mounted on the urban air mobility may obtain GPS coordinate information of the supply device 10 and/or another urban air mobility.

The V2X refers to a communication technology of exchanging information with other vehicles, pedestrians, and infrastructure-built objects via the wired/wireless communication. The V2X may be divided into vehicle-to-vehicle (V2V) for communication between the vehicles, vehicle-to-infrastructure (V2I) for communication between the vehicle and the infrastructure, vehicle-to-network (V2N) for communication between the vehicle and the communication network, and vehicle-to-pedestrian (V2P) for communication between the vehicle and the pedestrian. The V2X communication may be provided via a PC5 interface and/or a Uu interface.

A sidelink (SL) refers to a communication scheme in which the urban air mobilities may exchange data directly with each other without via a base station (BS) or an infrastructure—for example, a road side unit (RSU) by establishing a direct wireless link between the communication terminals mounted on the urban air mobilities. The SL may not only alleviate a burden of the base station caused by rapidly increasing data traffic, but also may be considered as a way to minimize a transmission delay during the communication between the urban air mobilities.

Figure 2:
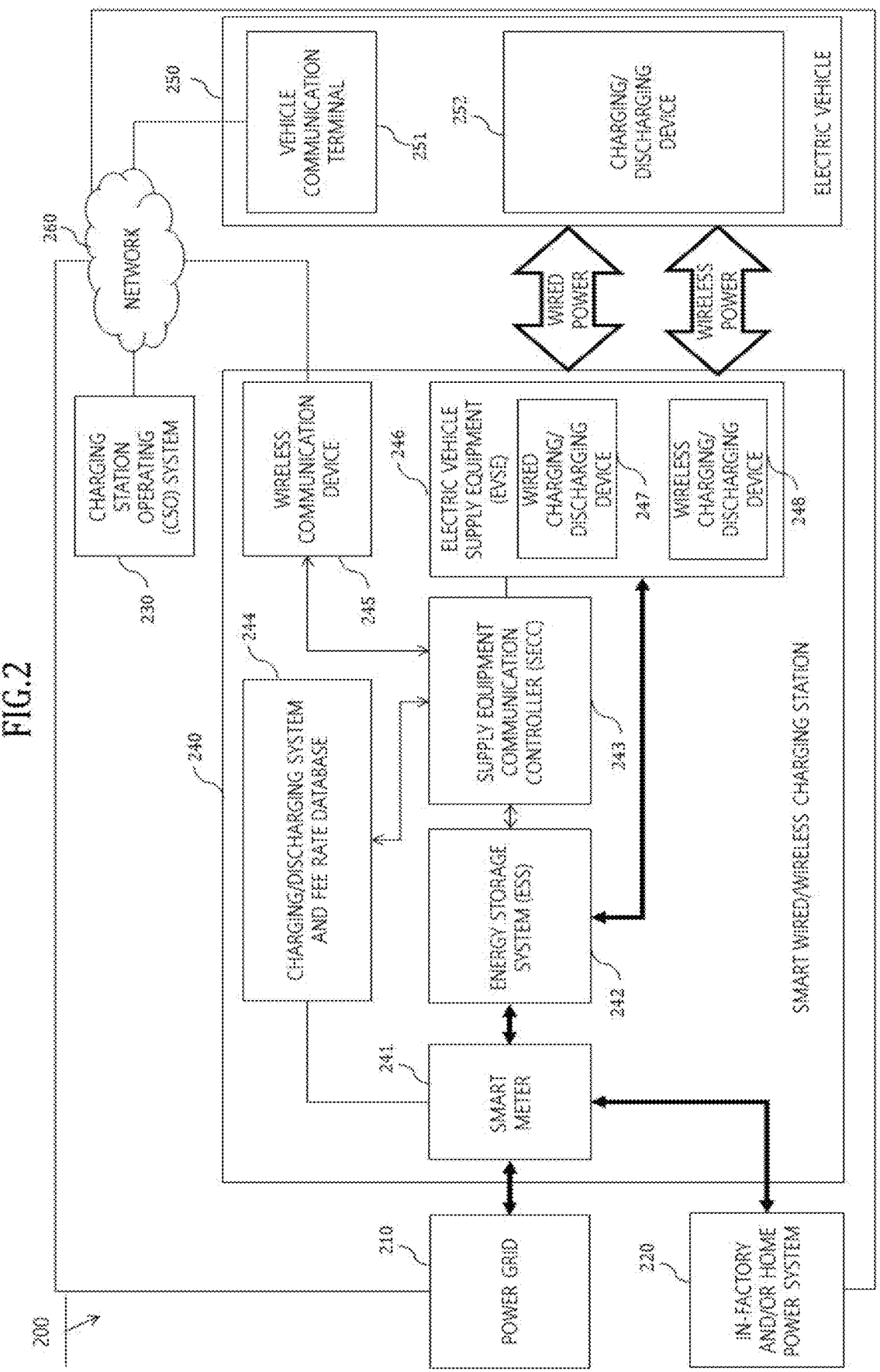
FIG. 2 is a diagram for illustrating an overall system structure for charging/discharging an electric vehicle according to an embodiment of the present disclosure.

FIG. 2 is a diagram for illustrating an overall system structure for charging/discharging an electric vehicle according to an embodiment of the present disclosure.

A smart grid is a next-generation power grid that combines an information technology (IT) with a power grid to create a new added value as a power provider and a consumer exchange information in real time in both directions and an energy efficiency is optimized. Accordingly, via the power information exchange in the both directions, rational energy consumption may be induced and high-quality energy and various additional services may be provided. In addition to grafting of a clean green technology such as new and renewable energy, the electric vehicle is drawing attention as an important factor for realizing the smart grid.

The electric vehicle may implement a vehicle-to-grid (V2G) by reversely transmitting the power via application of an on-board charger (OBC). In the V2G, the electric vehicle is seen as a consuming entity that receives and consumes the power, as well as a supply entity that is able to provide the power stored in the battery to another entity as one of distributed power sources.

For example, during a night time when electricity demand is low, the battery may be charged by supplying electrical energy to the electric vehicle, and during a day peak time when the electricity demand is high, the battery power charged in the electric vehicle may be reversely transmitted to the power grid to sell electricity.

Introduction of such concept may relieve a power load during the peak time of the power and create a new revenue model for an electric vehicle owner, the power grid, and the like.

Hereinafter, for convenience of description, an entire system for the charging and the discharging of the electric vehicle will be briefly described as a vehicle-to-grid system (V2G system).

Referring to FIG. 2, a V2G system 200 may be roughly composed of a combination of one or more of a power grid 210, an in-factory and/or home power system 220, a charging station operating (CSO) system 230, a smart wired/wireless charging station 240, an electric vehicle 250, and a network 260.

At least two of the smart wired/wireless charging station 240, the charging station operating system 230, the electric vehicle 250, the power grid 210, and the in-factory or home power system 220 may exchange information with each other via the network 260.

For example, the network 260 may include a wireless network as well as a wired network. For example, the wireless network may include at least one of a 3rd generation partnership project (3GPP) long term evolution (LTE)-based vehicle to everything (V2X) communication network, a 3GPP 5G new radio (NR)-based V2X communication network, an IEEE 802.11p-based wireless access for vehicle environment (WAVE) communication network, and a Wi-Fi communication network.

The smart wired/wireless charging station 240 may be composed of a combination of one or more of a smart meter 241, an energy storage system (ESS) 242, a supply equipment communication controller (SECC) 243, a charging/discharging system and fee rate database 244, a wireless communication device 245, and an electric vehicle supply equipment (EVSE) 246. In this regard, the EVSE 246 may be composed of a wired charging/discharging device 247 that transmits or receives the electric power in a wired manner via a charging cable to charge or discharging a high voltage battery of the electric vehicle 250, and a wireless charging/discharging device 248 that transmits or receives the wireless power using the electromagnetic induction scheme or the electromagnetic resonance scheme to charge or discharge the high voltage battery disposed in the electric vehicle 250.

The electric vehicle 250 may be composed of a charging/discharging device 252 that transmits or receives the wired power or the wireless power via power negotiation with the electric vehicle supply equipment 246, and a vehicle communication terminal 251 for performing communication with the wireless communication device 245 of the smart wired/wireless charging station 240, the charging station operating system 230, another vehicle, and the like.

As an example, power line communication (PLC) may be used for the wired charging/discharging between the electric vehicle supply equipment 246 and the charging/discharging device 252, and at least one short-range wireless communication among In-band communication, Zigbee communication, and Bluetooth communication may be used for the wireless charging/discharging.

The charging/discharging system/fee rate database 244 may maintain information on system parameters and a charging/discharging fee rate policy corresponding to the corresponding smart wired/wireless charging station 240.

The smart wired/wireless charging station 240 according to an embodiment may provide an area code (or a country code) thereof and the information on the system parameters and the charging/discharging fee rate policy corresponding to corresponding area code to the electric vehicle 250. The electric vehicle 250 may determine and set various power control parameters for the charging or the discharging based on the received system parameters, and may determine and set a charging/discharging schedule based on the charging/discharging fee rate policy. In this regard, the system parameters may include at least one of parameters related to an active power value, a reactive power value, an active current/voltage value, a reactive current/voltage value, and the like, parameters related to an operating frequency, and system fault information, and various legal matters, but the present disclosure may not be limited thereto. Other system parameters may be added or some system parameters may be omitted based on a design of those skilled in the art.

The electric vehicle 250 according to an embodiment may actually measure the active power value based on a power signal received after initiating the discharging or the charging, and may compare the actually measured active power value with the received active power parameter so as to calculate and correct an active power value to be actually applied for protecting a power system.

The electric vehicle 250 according to an embodiment may actually measure an operating frequency value based on the power signal received after initiating the discharging or the charging, and may compare the measured operating frequency value with the received frequency parameter so as to calculate and/or correct an operating frequency value to be actually applied for protecting the power system.

The electric vehicle 250 may perform the discharging or the charging based on the corrected active power value and the corrected operating frequency value.

The information on the system parameters and the charging/discharging fee rate policy according to an embodiment may be transmitted to the electric vehicle 250 via the wireless communication device 245 under control of the supply equipment communication controller 243, but this is only one embodiment. Information on the system parameters and the charging/discharging fee rate policy according to another embodiment may be transmitted to the electric vehicle 250 via the power line communication or the short-range wireless communication via the electric vehicle supply equipment 246 under the control of the supply equipment communication controller 243.

The information stored in the charging/discharging system/fee rate database 244 may be dynamically updated by the charging station operating system 230.

In another embodiment, the information on the system parameters and the charging/discharging fee rate policy may be provided by the charging station operating system 230 to the electric vehicle 250 in response to a request of the electric vehicle 250 or the smart wired/wireless charging station 240.

As an example, the electric vehicle 250 may make a request for the information on the system parameters and the charging/discharging fee rate policy corresponding to a current location thereof or a travel route thereof to the charging station operating system 230, and the charging station operating system 230 may provide the electric vehicle 250 with the information on the system parameters and the charging/discharging fee rate policy corresponding to the request of the electric vehicle 250.

As an example, the electric vehicle 250 may transmit travel information related to a travel distance, a travel time, an energy consumption per unit distance and/or a unit time, a travel schedule, and the like to the charging station operating system 230. In this case, the charging station operating system 230 may generate and maintain travel statistics data in units of days/weeks/months/quarters/seasons/years based on the travel information received from the electric vehicle 250. In an embodiment, the charging station operating system 230 may provide the travel statistics data of the corresponding electric vehicle 250 to the electric vehicle 250. The electric vehicle 250 may perform optimal charging/discharging scheduling based on charging/discharging fee rate policy information based on an area code and/or a power grid code and/or a charge point identification code corresponding to the current location thereof and the travel statistical data. In another embodiment, the charging station operating system 230 may obtain information on the current location and/or a future travel schedule of the electric vehicle 250. In this case, the charging station operating system 230 may determine an optimal charging/discharging schedule for the corresponding electric vehicle 250 based on the previously generated travel statistics data and the obtained current location and/or the information on the future travel schedule, and transmit the information on the determined charging/discharging schedule to the corresponding electric vehicle 250.

In the above embodiment, the description has been made that the charging/discharging schedule is determined by the charging station operating system 230 or the electric vehicle 250, but this is only one embodiment. A charging/discharging schedule according to another embodiment may be determined via a separate cloud server connected to the network. Accordingly, a processing load for the charging/discharging scheduling of the charging station operating system 230 and/or the electric vehicle 250 may be efficiently distributed.

The smart meter 241 may measure an amount of power received from the power grid 210 or the in-factory or home power system 220 during the battery charging of the energy storage system 242.

In addition, the smart meter 241 may measure an amount of power transmitted to the power grid 210 or the in-factory or home power system 220 for the battery discharging of the energy storage system 242.

The smart meter 241 may calculate a difference value between a charged amount and a discharged amount measured for each power grid/in-factory power system/in-home power system, and may provide information on the calculated difference value to the charging station operating system 230. In this case, the charging station operating system 230 may generate billing information in units of days/weeks/months/quarters/years based on the information received from the smart meter 241, and transmit the generated billing information to a terminal in association with the corresponding power grid 210 and/or a terminal in association with the in-factory or home power system 220.

The electric vehicle 250 according to an embodiment may perform the discharging scheduling by dynamically determining a discharging time period leading to a maximum discharging fee based on the fee rate policy information corresponding to the corresponding area code.

In addition, the electric vehicle 250 according to an embodiment may perform the charging scheduling by dynamically determining a charging time period leading to a minimum charging fee based on the fee rate policy information corresponding to the corresponding area code.

While stopping or traveling, the electric vehicle 250 may automatically perform the charging or the discharging in the corresponding time period based on the scheduling result.

The electric vehicle 250 according to an embodiment may perform the charging/discharging not only in the stopped state but also in the traveling state. For example, when the power transmitter/receiver capable of transmitting/receiving the wireless power is embedded on the road, the electric vehicle 250 may perform the charging/discharging in the traveling state based on the determined charging/discharging schedule information.

To this end, the V2G system 200 according to an embodiment of the present disclosure may be implemented to enable the charging/discharging while the electric vehicle is traveling as well as the charging/discharging while the electric vehicle is stopped.

As an example, the V2G system 200 may be implemented to enable the charging/discharging in one scheme among the wired charging/discharging and the wireless charging/discharging while the electric vehicle is stopped, and may be implemented such that only the wireless charging/discharging may be performed while the electric vehicle is traveling. To this end, the smart wired/wireless charging station 240 may monitor a current travel state of the electric vehicle 250 and adaptively determine which charging/discharging mode to operate in based on the current travel state monitoring result. In this regard, the charging/discharging mode may be largely divided into a wired charging/discharging mode and a wireless charging/discharging mode. When both of the wired charging/discharging mode and the wireless charging/discharging mode are applicable, the smart wired/wireless charging station 240 may be implemented to measure charging efficiencies of the two modes and compare the efficiencies with each other and operate in a mode having better charging efficiency. In one example, the smart wired/wireless charging station 240 may be implemented to simultaneously charge/discharge the plurality of electric vehicles 250, and in this case, a current available charging/discharging mode may be determined.

The electric vehicle 250 according to an embodiment may obtain information on a fee rate policy for each power grid from the charging station operating system 230 or the smart wired/wireless charging station 240. In this case, the electric vehicle 250 may dynamically determine which power grid to perform the charging/discharging with based on the fee rate policy for each power grid, and may perform the charging/discharging scheduling based on a fee rate policy of the determined power grid.

As an example, the electric vehicle 250 may adaptively select a power grid leading to the maximum discharging fee and the minimum charging fee by analyzing the charging/discharging fee rate policy for each power grid and comparing the charging/discharging fee rate policies with each other.

The electric vehicle 250 according to an embodiment may receive information on a charging/discharging fee rate policy for each area code and/or power grid code corresponding to a current travel path set in the navigation from the charging station operating system 230. In this case, the electric vehicle 250 may select an area code and/or a power grid code leading to the maximum discharging fee and the minimum charging fee on the current travel path, and dynamically perform the charging/discharging scheduling based on a charging/discharging fee rate policy corresponding to the selected area code and/or power grid code.

The electric vehicle 250 according to an embodiment may transmit information on the current location and/or the current travel path thereof to the charging station operating system 230 to obtain information on a location of the smart wired/wireless charging station 240 disposed at the current location and/or on the current travel path.

In another embodiment, when the location information of the smart wired/wireless charging station and the charging/ discharging fee rate information for each smart wired/wireless charging station are maintained in map information of a navigation system equipped in the electric vehicle 250, the electric vehicle 250 may perform the charging/discharging scheduling based on the navigation information.

Figure 3:
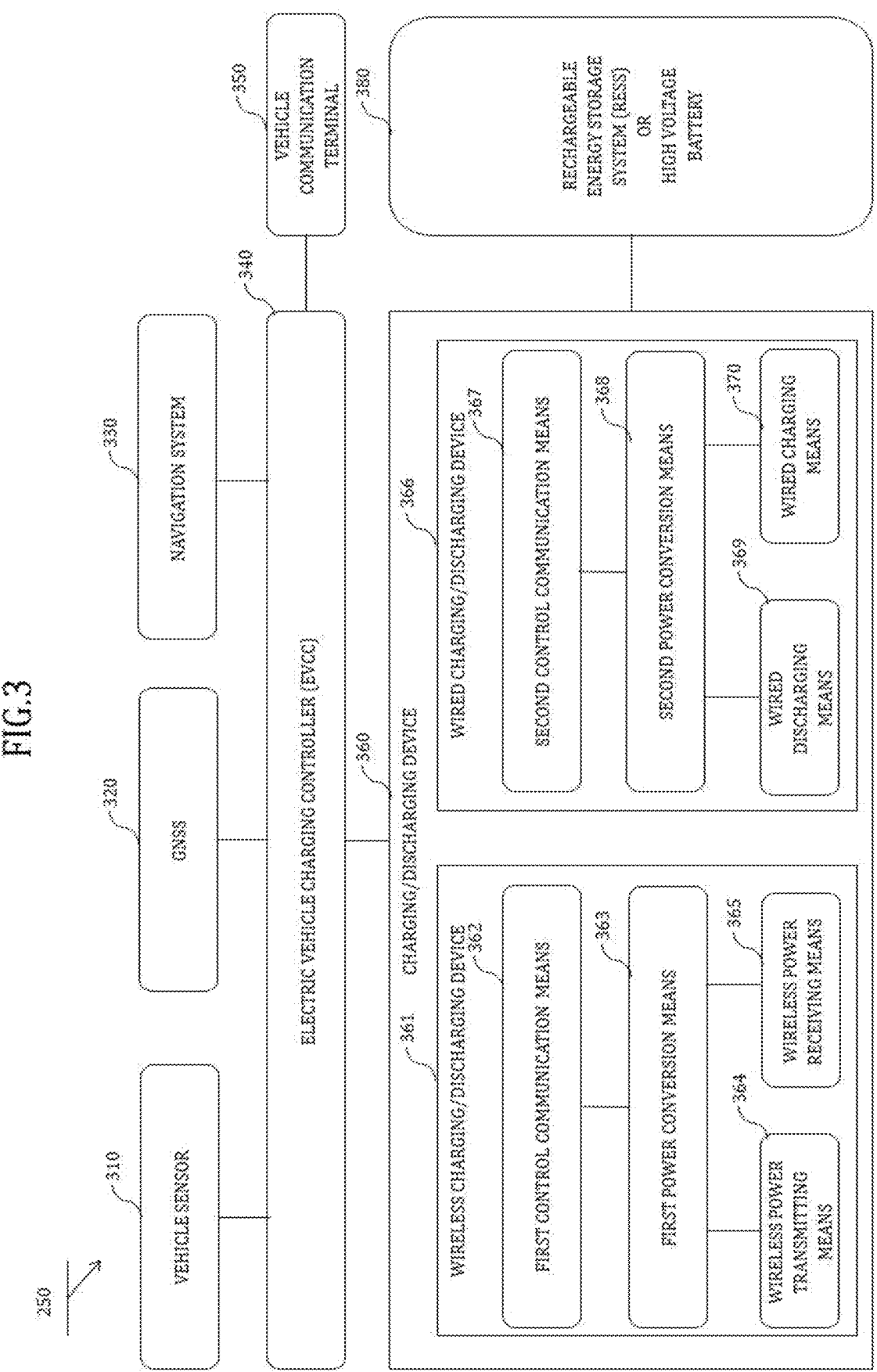
FIG. 3 is a block diagram for illustrating a structure of an electric vehicle according to an embodiment of the present disclosure.

FIG. 3 is a block diagram for illustrating a structure of an electric vehicle according to an embodiment of the present disclosure.

Referring to FIG. 3, the electric vehicle 250 may be composed of at least one of a vehicle sensor 310, a global navigation satellite system (GNSS) 320, a navigation system 330, an electric vehicle charging controller (EVCC) 340, a charging/discharging device 360, and a rechargeable energy storage system (RESS) or high voltage battery 380.

The vehicle sensor 310 may include at least one of a camera, an ultrasonic sensor, a smart parking assistance system (SPAS) sensor, a radar, and a light detection and ranging (LiDAR). For example, the camera may include at least one of a front camera, a rear camera, a left/right camera, an upper camera, and a lower camera. As an example, the camera may include at least one of a surround view monitor (SVM) camera, an RGB camera, and an infrared camera.

The GNSS 320 may correct location information—that is, GPS (X,Y) coordinate information—using a differential global positioning system (DGPS) or real time kinematic (RTK) technology that fuses information received from a separate fixed reference station other than a GPS receiver connected to the navigation system 330 with GPS received information, thereby obtaining location information with higher precision of cm level. In addition, the electric vehicle 250—for example, the electric vehicle charging controller 340—may also mitigate an error occurred in the differential global positioning system (DGPS) or real time kinematic (RTK) technology in a software manner, or fuse sensing information of an inertial navigation sensor such as a milometer, an accelerometer, and a gyroscope with the GPS received information to obtain the location information of the electric vehicle 250 with the higher precision. As another example, the electric vehicle 250—for example, the electric vehicle charging controller 340—may correct GNSS received information in a map matching scheme of mapping a road and a landmark detected by a camera image and the LiDAR sensor to a location on a map using a precise electronic map such as a local dynamic map (LDM) that provides dynamic map information, thereby improving an accuracy of positioning.

The navigation system 330 may provide location information of the smart wired/wireless charging station mapped to high-precision map information and charging/discharging fee rate information of the corresponding smart wired/wireless charging station.

The electric vehicle charging controller 340 may control communication and overall operations for the wireless charging/discharging with the electric vehicle 250. In an embodiment, the electric vehicle charging controller 340 may provide ISO/IEC 15118 vehicle to grid communication interface (V2GCI) to perform authentication and security procedures for the electric vehicle 250.

The EVCC 340 of the electric vehicle 250 and the SECC 243 of the smart wired/wireless charging station 240 may establish an encrypted communication session using a transport layer security (TLS) handshake.

During the TLS handshake, the smart wired/wireless charging station 240 may provide a series of digital certificates—for example, a SECC certificate- to the electric vehicle 250 so as to be identified as a trusted charge point.

Thereafter, the electric vehicle 250 may verify digital signatures of all certificates including the SECC certificate and determine whether the certificates have expired. When it is confirmed that there is no problem in all of the certificates, the TLS session may be successfully established.

The electric vehicle 250 may use a contract certificate for smooth authentication and authorization. In this regard, the contract certificate may be issued by the charging station operating system 230, but this is only one embodiment, and may be issued via a server of another e-mobility service provider (EMSP).

For example, the newly issued contract certificate may be transmitted to the corresponding electric vehicle 250 via the smart wired/wireless charging station 240. Messages directly exchanged between the electric vehicle 250 and the smart wired/wireless charging station 240 may be defined, such as a certificate installation request and a certificate installation response message for installing the new contract certificate in the electric vehicle 250.

The electric vehicle 250 may transmit information on a valid contract certificate to the smart wired/wireless charging station 240 before receiving the wired/wireless power from the smart wired/wireless charging station 240 to charge the RESS 380 thereof or discharging the power charged in the RESS 380 thereof to the smart wired/wireless charging station 240. In this regard, the contract certificate may be in association with a billing account managed by the charging station operating system 230 via a unique identifier called an e-mobility account identifier (EMAID).

As an example, the charging station operating system 230 may calculate a charging/discharging fee for the electric vehicle 250 based on the corresponding fee rate policy, then reflect the calculation result to the corresponding billing account, and then transmit the calculation result to the electric vehicle 250 or a user terminal (not shown) in association with the electric vehicle 250. As another example, the smart wired/wireless charging station 240 may calculate the charging/discharging fee for the electric vehicle 250 based on the corresponding fee rate policy, and directly transmit the calculation result to the electric vehicle 250 or transmit the calculation result to the charging station operating system 230 so as to control the charging station operating system 230 to transmit processing information on the charging/discharging fee to the electric vehicle 250.

According to an embodiment, the electric vehicle charging controller 340 may exchange various information by performing communication with the charging station operating system 230 via the network 260. For example, the electric vehicle charging controller 340 may make a request for at least one of the area code information and/or the power grid code information and/or the smart wired/wireless charging station identification code information corresponding to the current location and/or the current set travel path of the electric vehicle 250, and the charging/discharging fee rate policy information corresponding to the corresponding at least one code to the charging station operating system 230 to obtain the same. In this case, the electric vehicle charging controller 340 may select the area code and/or the power grid code and/or the smart wired/wireless charging station identification code leading to the maximum discharging fee and the minimum charging fee at the current location and/or on the current travel path, and perform the charging/discharging scheduling based on the charging/discharging fee rate policy corresponding to the selected area code and/or power grid code and/or smart wired/wireless charging station identification code.

The electric vehicle charging controller 340 according to another embodiment may obtain, from the smart wired/wireless charging station 240, the charging/discharging system parameter information and the charging/discharging fee rate policy information corresponding to the corresponding smart wired/wireless charging station 240. In this case, the electric vehicle charging controller 340 may calculate and correct at least one of an optimal operating frequency, an optimal active power value, and an optimal reactive power value for the charging/discharging based on the charging/discharging system parameter information. In addition, the electric vehicle charging controller 340 may optimize the charging/discharging scheduling based on the charging/discharging fee rate policy corresponding to the smart wired/wireless charging station 240.

The electric vehicle charging controller 340 according to an embodiment may identify a current detailed location of the corresponding vehicle based on the sensing information and the navigation map information collected from the GNSS 320, and determine whether the corresponding vehicle has passed a front border based on the identified current detailed location. In a case of the front border passing as a result of the determination, the electric vehicle charging controller 340 may automatically update, in association with the charging station operating system 230, the area code to correspond to the country the vehicle has reached, and the system parameter and/or the charging/discharging fee rate policy to correspond to the updated area code immediately after passing the border (or immediately before passing the border).

The electric vehicle charging controller 340 according to an embodiment may determine whether the corresponding vehicle has passed the border based on the current location measured during the travel of the corresponding vehicle, and automatically update, in association with the charging station operating system 230, the power grid code, and the system parameter and/or the charging/discharging fee rate policy to correspond to the updated power grid code immediately before passing the border (or immediately after passing the border).

The electric vehicle charging controller 340 according to an embodiment may update the area code, and the charging/discharging fee rate policy and the system parameter to correspond to the updated area code based on user input information on the navigation system 330 (or a pre-designated user terminal). In this regard, the user input information may include information on a preferred country (or a preferred area) for performing the charging/discharging.

The electric vehicle charging controller 340 according to an embodiment may update the power grid code, and the charging/discharging fee rate policy and the system parameters to correspond to the updated power grid code based on the user input information on the navigation system 330 (or the pre-designated user terminal). In this regard, the user input information may include information on a preferred power grid for performing the charging/discharging.

In an embodiment, the electric vehicle charging controller 340 may update the operating frequency and the active power value for the charging/discharging based on the system parameter updated based on the user input, and store the updated operating frequency and active power value. Thereafter, the electric vehicle charging controller 340 may compare an optimal operating frequency and an active power value actually measured during the actual charging/discharging with the pre-stored optimal operating frequency and active power value to calculate and correct an optimal operating frequency and active power value for protecting the system.

In an embodiment, the electric vehicle charging controller 340 may be equipped with a pre-learned artificial intelligence for the charging/discharging scheduling, and may perform the optimal charging/discharging scheduling based on the charging/discharging fee rate policy updated based on the user input. In this regard, the charging/discharging scheduling may include information on an optimal discharging time period and information on an optimal charging time period. The electric vehicle charging controller 340 may perform the charging/discharging scheduling based on a learned logic such that the maximum discharging fee and the minimum charging fee occur.

The charging/discharging device 360 may be composed of at least one of a wireless charging/discharging device 361 and a wired charging/discharging device 366.

The wireless charging/discharging device 361 may be composed of first control communication means 362, first power conversion means 363, wireless power transmitting means 364, and wireless power receiving means 365.

The first control communication means 362 may perform communication for the wireless charging/discharging with the smart wired/wireless charging station 240 and a control operation for a lower module.

The first control communication means 362 may perform operations such as mutual authentication, power negotiation, and power control with the smart wired/wireless charging station 240 via the In-band Communication or out-of-band communication. In an embodiment, the first control communication means 362 may set the system parameter values—for example, the operating frequency, the active power value, the reactive power value, and the like-based on a control signal of the electric vehicle charging controller 340.

The first power conversion means 363 may control an inverter under control of the first control communication means 362 to convert DC power discharged from the RESS 380 into AC power and transmit the AC power to the wireless power transmitting means 364.

The wireless power transmitting means 364 may convert the AC power applied from the first power conversion means 363 to have a specific operating frequency via an LC circuit and output the converted power wirelessly.

The wireless power receiving means 365 may receive the AC power signal from the smart wired/wireless charging station 240, rectify the signal, and then transmit the rectified signal to the first power conversion means 363.

The first power conversion means 363 may receive the rectified power from the wireless power receiving means 365 and convert the rectified power into DC power required for the charging of the RESS 380 to charge the RESS 380.

The wired charging/discharging device 366 may be composed of second control communication means 367, second power conversion means 368, wired discharging means 369, and wired charging means 370.

The second control communication means 367 may perform communication for the wireless charging/discharging with the smart wired/wireless charging station 240 and a control operation for a lower module.

The second control communication means 367 may perform operations such as mutual authentication, power negotiation, and power control with the smart wired/wireless charging station 240 via the wired communication—for example, the PLC-. In an embodiment, the second control communication means 367 may set the system parameter values—for example, the operating frequency, the active power value and the reactive power value based on the operating frequency, and the like-based on a control signal of the electric vehicle charging controller 340.

The second power conversion means 368 may convert the DC or AC power applied from the RESS 380 into DC or AC power required by the smart wired/wireless charging station 240 under the control of the second control communication means 367. In this regard, the converted power may be transmitted to the wired charging/discharging device 247 of the smart wired/wireless charging station 240 via the wired discharging plug 369.

The second power conversion means 368 may receive the AC or DC power from the wired charging/discharging device 247 of the smart wired/wireless charging station 240 via the wired charging inlet 370, and convert the received AC or DC power into AC or DC power required by the RESS 380 to charge the RESS 380.

The electric vehicle charging controller 340 may be wirelessly connected to at least one of the smart wired/wireless charging station 240, the charging station operating system 230, the power grid 210, the in-factory or home power system 220, and the user terminal (not shown) via the vehicle communication terminal 350 to exchange information.

In an embodiment, in a case of an area where a number of countries are conterminous with each other and travel between countries is free as in Europe, the electric vehicle charging controller 340 may automatically update a current location (or an address corresponding to the current location) thereof using information of the GNSS 320 and/or in association with the navigation system 330 based on user definition, or may update the current location (or the address corresponding to the current location) thereof based on the user input information. The electric vehicle charging controller 340 may generate and output a predetermined notification message informing the user that the border is getting close while approaching the border.

In another embodiment, when an error occurs because the location (or address) information input by the user based on the user definition and the location (or address) information identified based on the information of the GNSS 320 and/or the information provided by the navigation system 330 are different from each other, the electric vehicle charging controller 340 may automatically determine the current location (or address) thereof as the location (or the address) identified based on the information of the GNSS 320 and/or the information provided by the navigation system 330 after user confirmation.

As described above, the electric vehicle 250 according to the present disclosure may dynamically obtain, via the network 260 and/or the smart wired/wireless charging station 240, the information on the system parameters and/or the charging/discharging fee rate policy corresponding to the area code and/or the power grid code and/or the smart wired/wireless charging station identification code for the charging/discharging based on the current location and/or the current travel path and/or the user input, thereby not only being able to set the optimal system parameters for the system protection, but also being able to perform the cost-optimized charging/discharging scheduling.

Figure 4:
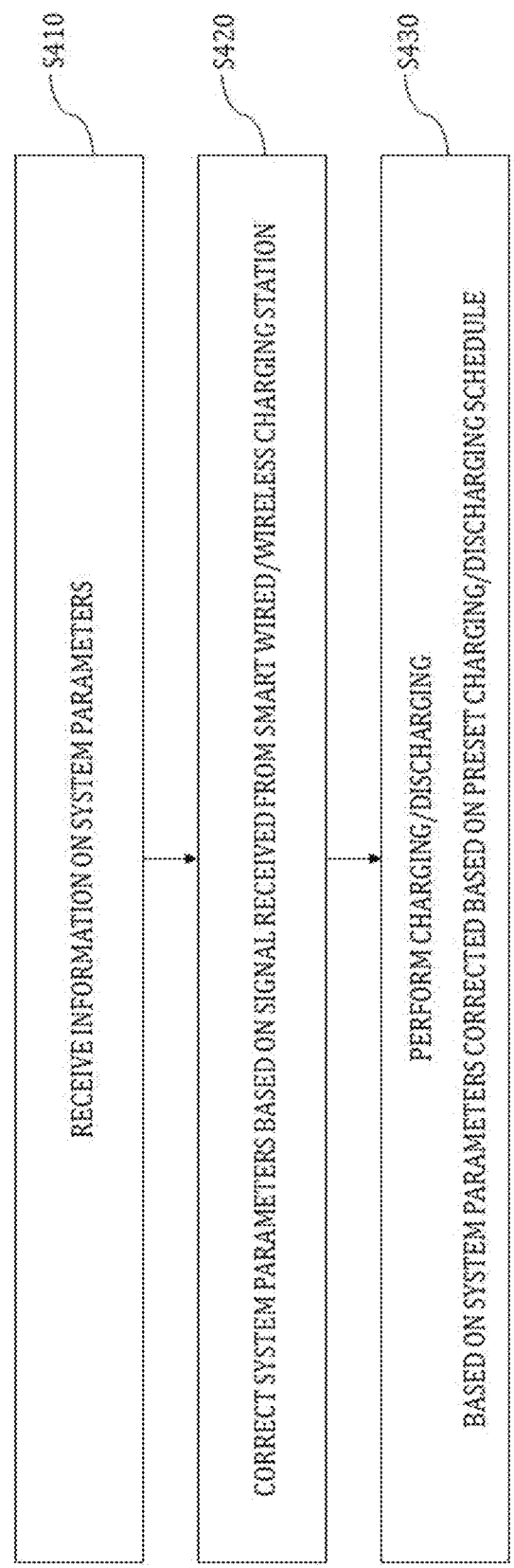
FIG. 4 is a flowchart for illustrating a method for charging/discharging an electric vehicle according to an embodiment of the present disclosure.

FIG. 4 is a flowchart for illustrating a method for charging/discharging an electric vehicle according to an embodiment of the present disclosure.

In detail, FIG. 4 is a flowchart for illustrating a method for setting the system parameters for the charging/discharging in the electric vehicle 250.

Referring to FIG. 4, the electric vehicle 250 may receive the information on the system parameters (S410). In this regard, the system parameters may include at least one of identification code information, information on an operating frequency corresponding to the corresponding identification code, information on active power corresponding to the corresponding identification code, information on reactive power corresponding to the corresponding identification code, and regulation information corresponding to the corresponding identification code. In one example, the identification code information may include at least one of the area code for identifying a country and/or an administrative district, the power grid code for identifying the power grid, and the charge point identification code (or the smart wired/wireless charging station code) for identifying the charge point.

The electric vehicle 250 may correct the predefined system parameter values based on a signal—for example, a predetermined reference power signal-received from the smart wired/wireless charging station 240 (S420). In this regard, the corrected system parameter values may include, but may not be limited to, the operating frequency value and the active power value for the power system protection, and may further include the reactive power value and the like.

The electric vehicle 250 may perform the charging/discharging based on the system parameters corrected based on the preset charging/discharging schedule (S430).

Figure 5:
FIG. 5 is a flowchart for illustrating a method for charging/discharging an electric vehicle according to an embodiment of the present disclosure.

FIG. 5 is a flowchart for illustrating a method for charging/discharging an electric vehicle according to an embodiment of the present disclosure.

In detail, FIG. 5 is a flowchart for illustrating a method for setting the active power value for the charging/discharging in the electric vehicle 250.

Referring to FIG. 5, the electric vehicle 250 may communicate with the smart wired/wireless charging station 240 (S510). In this regard, the communication scheme between the electric vehicle 250 and the smart wired/wireless charging station 240 may be the wireless communication, but this is only one embodiment, and the wired communication such as the PLC may be used.

The electric vehicle 250 may receive the information on the system parameters corresponding to the area code (S520). In this regard, the system parameters may include, but may not be limited to, the information on the operating frequency and the information on the active power value for the power charging/discharging. In an embodiment, the operating frequency may include at least one of an operating frequency for the wireless charging/discharging and an operating frequency for the wired charging/discharging. In addition, the active power value may also include at least one of an active power value for the wireless charging/discharging and an active power value for the wired charging/discharging.

The electric vehicle 250 may measure the operating frequency based on a power signal—for example, a predetermined reference power signal-received from the smart wired/wireless charging station 240 (S530).

The electric vehicle 250 may correct the operating frequency value by comparing the received operating frequency value with the measured operating frequency value for protecting the power system (S540). As an example, when at least two of frequency values—that is, an L1 frequency value, an L2 frequency value, and an L3 frequency value-measured for AC 3-phase input match with the received operating frequency values, the electric vehicle 250 may determine the measured frequency values as valid operating frequency values. The electric vehicle 250 may compare the effectively measured operating frequency value with the received operating frequency value to determine one of those as a final operating frequency value. For example, the electric vehicle 250 may determine a smaller frequency value among the effectively measured operating frequency value and the received operating frequency value as the final operating frequency value and correct the smaller frequency value for protecting the system. As an example, when the received operating frequency value included in the system parameter is 49.5 Hz and the operating frequency value measured by the OBC of the electric vehicle 250 is 50 Hz, for the system protection purpose, 49.5 Hz, which is a lower value, may be determined as the final operating frequency value. When the effective operating frequency is not measured, the electric vehicle 250 may determine the received operating frequency value as the final operating frequency value.

The electric vehicle 250 may calculate an active power value corresponding to the corrected operating frequency based on a predefined operating frequency/active power value mapping table or an equation (S550). As an example, the active power value may be calculated as 0.3 times the maximum transmission power (PMAX), but this is only one embodiment. A method for calculating active power for each area/power grid/smart wired/wireless charging station may be defined differently.

The electric vehicle 250 may measure the active power value based on the power signal—for example, the predetermined reference power signal-received from the smart wired/wireless charging station 240 (S560).

The electric vehicle 250 may correct the active power value by comparing the calculated active power value with the measured active power value for the system protection (S570). As an example, when the measured active power value is smaller than the calculated active power value, the electric vehicle 250 may perform the power negotiation with the smart wired/wireless charging station 240 such that the measured active power value becomes equal to or higher than the calculated active power value to correct the active power value.

When succeeding in correcting the active power value, the electric vehicle 250 may perform the charging/discharging based on the predetermined charging/discharging scheduling.

Figure 6:
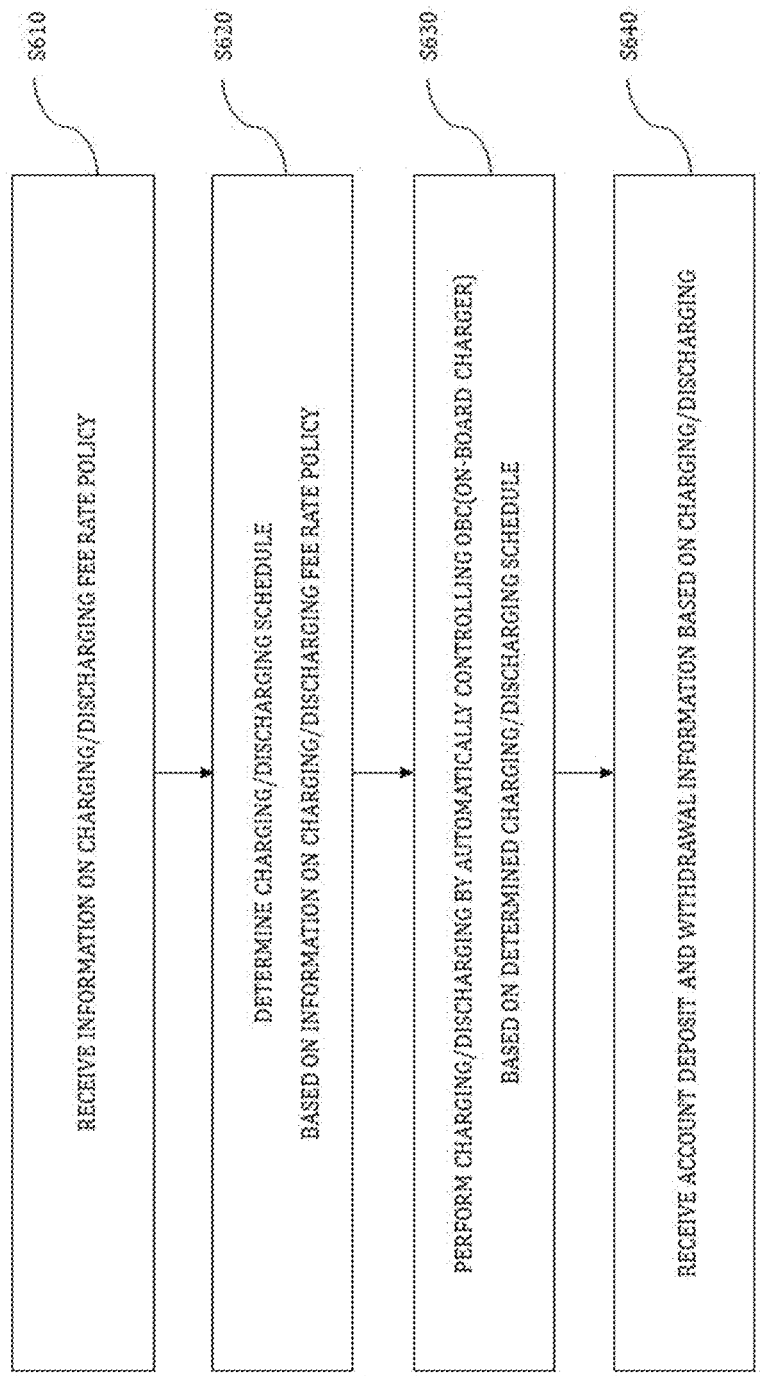
FIG. 6 is a flowchart for illustrating a method for charging/discharging an electric vehicle according to another embodiment of the present disclosure.

FIG. 6 is a flowchart for illustrating a method for charging/discharging an electric vehicle according to another embodiment of the present disclosure.

In detail, FIG. 6 is a flowchart for illustrating a method for performing the charging/discharging scheduling based on the area code in the electric vehicle 250.

Referring to FIG. 6, the electric vehicle 250 may receive the information on the charging/discharging fee rate policy via the wired or wireless communication (S610). In this regard, the information on the charging/discharging fee rate policy may be received via the communication with the smart wired/wireless charging station 240, but this is only one embodiment, and may be received from the charging station operating system 230 in response to a separate request of the electric vehicle 250 or may be automatically transmitted and updated by the charging station operating system 230 based on the current location of the electric vehicle 250. In this regard, the information on the charging/discharging fee rate policy may include information on charging and discharging fees for each time period. In addition, the charging/discharging fee rate policy may be predefined in unit of area code, but this is only one embodiment, and may be defined in a power grid code unit and/or in a smart wired/wireless charging station unit based on a design of those skilled in the art can be defined.

The electric vehicle 250 may determine the charging/discharging schedule thereof based on the information on the charging/discharging fee rate policy (S620). As an example, the charging/discharging schedule may be determined such that the maximum discharging fee and the minimum charging fee occur.

The electric vehicle 250 may perform the charging or the discharging by automatically controlling the on-board charger (OBC) based on the determined charging/discharging schedule (S630).

In an embodiment, the electric vehicle 250 may receive account deposit and withdrawal information based on the charging/discharging from the charging station operating system 230 or the smart wired/wireless charging station 240 (S640). The user may identify an account deposit and withdrawal state in real time via a predetermined user interface screen equipped in the electric vehicle 250. In one example, the account deposit and withdrawal information based on the charging/discharging may be transmitted to the preset user terminal (not shown) in association with the electric vehicle 250.

Although it has been described that the charging/discharging scheduling of the electric vehicle 250 is performed based on the charging/discharging fee rate policy corresponding to the area code in the embodiment in FIG. 6, this is only one embodiment. The charging/discharging scheduling of the electric vehicle 250 may be performed based on the charging/discharging fee rate policy corresponding to the power grid code, or may be performed based on the charging/discharging fee rate policy corresponding to the smart wired/wireless charging station identification code.

In another embodiment, the charging/discharging scheduling of the electric vehicle 250 may be performed based on a charging/discharging fee rate policy corresponding to at least one of the area code, the power grid code, and the smart wired/wireless charging station identification code based on a user setting.

In another embodiment, the charging/discharging scheduling of the electric vehicle 250 may be performed further based on travel statistics information collected for the corresponding electric vehicle 250 as well as the above-described charging/discharging fee rate policy.

In another embodiment, the charging/discharging scheduling of the electric vehicle 250 may be performed further based on at least one of the charging/discharging fee rate policy and the travel statistics information described above as well as a future travel plan input by the user.

In another embodiment, the charging/discharging scheduling of the electric vehicle 250 may be performed further based on at least one of the charging/discharging fee rate policy, the travel statistics information, and the future travel plan described above as well as power demand prediction information estimated based on big data and a predetermined power consumption prediction algorithm. As an example, the big data may include information on total power consumption and power production for each date/area/time period/weather/temperature. For example, the discharging fee rate may be increased based on an amount (or ratio) by which the power consumption exceeds the power production, and the discharging fee rate may be decreased based on an amount (or a ratio) by which the power consumption falls below the power production. On the other hand, the charging fee rate may be increased based on the amount (or the ratio) by which the power consumption exceeds the power production, and the charging fee rate may be decreased based on the amount (or the ratio) by which the power consumption falls below the power production. In addition, the big data may further include additional statistical data such as a proportion and the number of electric vehicles capable of being charged/discharged for each area, an average charging time and an average discharging time for each electric vehicle type, a life pattern, driver's gender and age, a traffic volume, a driving distance, a battery charging characteristic, and the like.

In an embodiment, the charging/discharging fee rate for each area/power grid/charge point may be changed in real time based on the power demand prediction. Accordingly, the electric vehicle 250 may receive and synchronize the information on the charging/discharging fee rate policy updated for each corresponding area/power grid/charge point in real time.

Figure 7:
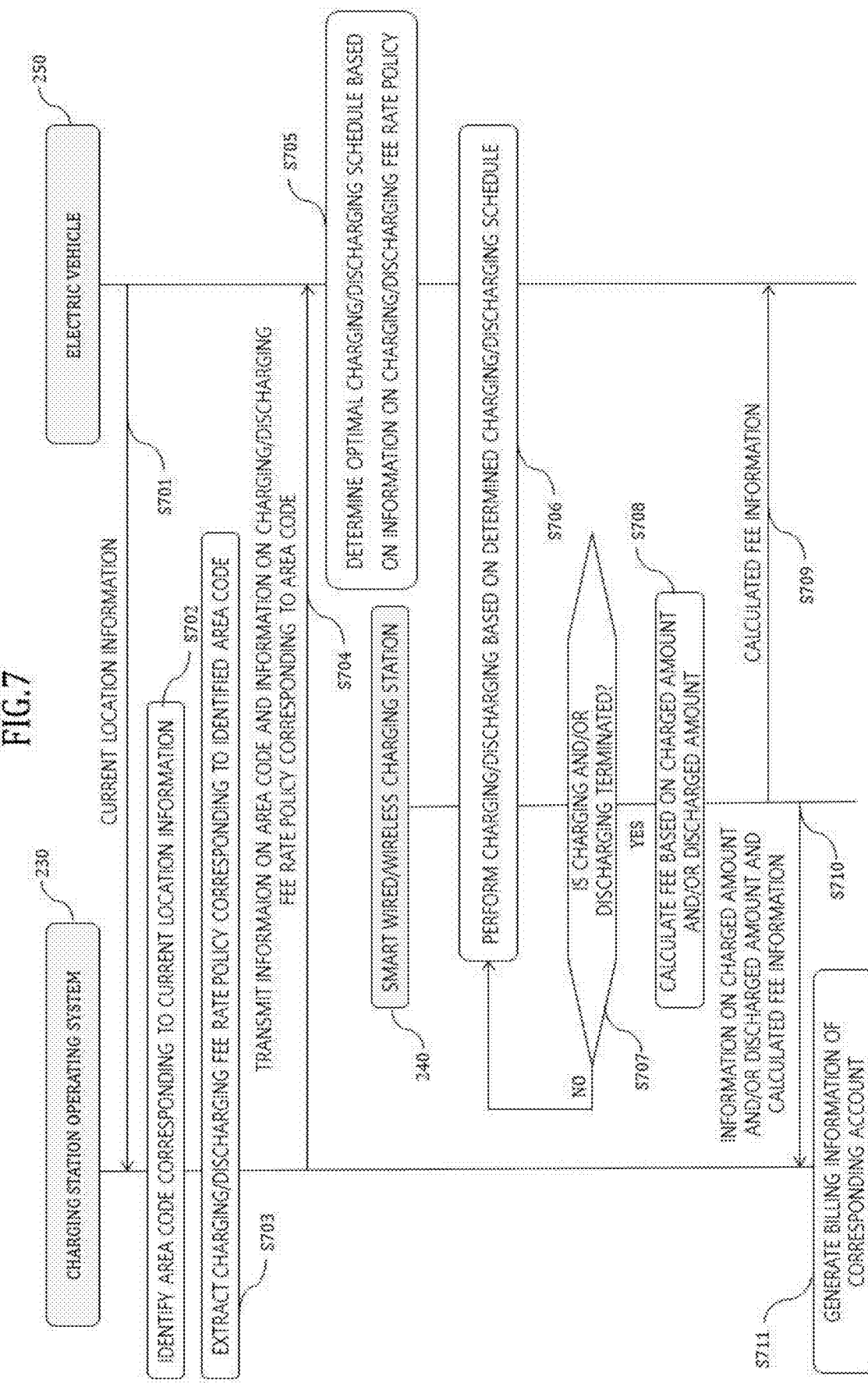
FIG. 7 is a flowchart for illustrating a charging/discharging procedure of an electric vehicle according to an embodiment of the present disclosure.

FIG. 7 is a flowchart for illustrating a charging/discharging procedure of an electric vehicle according to an embodiment of the present disclosure.

In detail, FIG. 7 is a flowchart for illustrating a procedure for controlling the charging/discharging based on the charging/discharging schedule of the electric vehicle determined based on the charging/discharging fee rate policy for each area code in the V2G system.

Referring to FIG. 7, the electric vehicle 250 may transmit the current location information to the charging station operating system 230 via the network 260 (S701).

The charging station operating system 230 may identify an area code corresponding to the current location information of the electric vehicle 250, and extract information on a charging/discharging fee rate policy corresponding to the identified area code from an internal database (S702 to S703). In this regard, the charging/discharging fee rate policy may be dynamically updated based on power demand prediction for each area, but this is only one embodiment, and may be updated in response to a request of the power grid or a request of an operator of the smart wired/wireless charging station 240.

The charging station operating system 230 may transmit the identified area code and the information on the charging/discharging fee rate policy extracted corresponding to the corresponding area code to the electric vehicle 250 (S704).

The electric vehicle 250 may determine the optimal charging/discharging schedule based on the user input travel plan and the received charging/discharging fee rate policy (S705). The electric vehicle 250 according to an embodiment may determine the optimal charging/discharging schedule further based on at least one of the user input travel plan (or travel pattern) and the battery charged state as well as the received charging/discharging fee rate policy.

The electric vehicle 250 may perform the charging/discharging with the smart wired/wireless charging station 240 based on the determined charging/discharging schedule (S706).

The smart wired/wireless charging station 240 may calculate the charged amount and/or the discharged amount when the charging and/or the discharging is terminated, and calculate the fee based on the calculated charged amount and/or discharged amount (S707 to S708).

The smart wired/wireless charging station 240 may transmit the calculated fee information to the electric vehicle 250 (S709).

In addition, the smart wired/wireless charging station 240 may transmit a billing request message containing the charged amount and/or discharged amount calculated corresponding to the electric vehicle 250 and the calculated fee information to the charging station operating system 230. (S710).

The charging station operating system 230 may identify an account based on the received billing request message, and generate billing information corresponding to the identified account (S711).

The charging station operating system 230 according to an embodiment may perform automatic payment based on the generated billing information, and transmit an automatic payment result to the electric vehicle 250 or the user terminal (not shown) in association with the electric vehicle 250.

Figure 8:
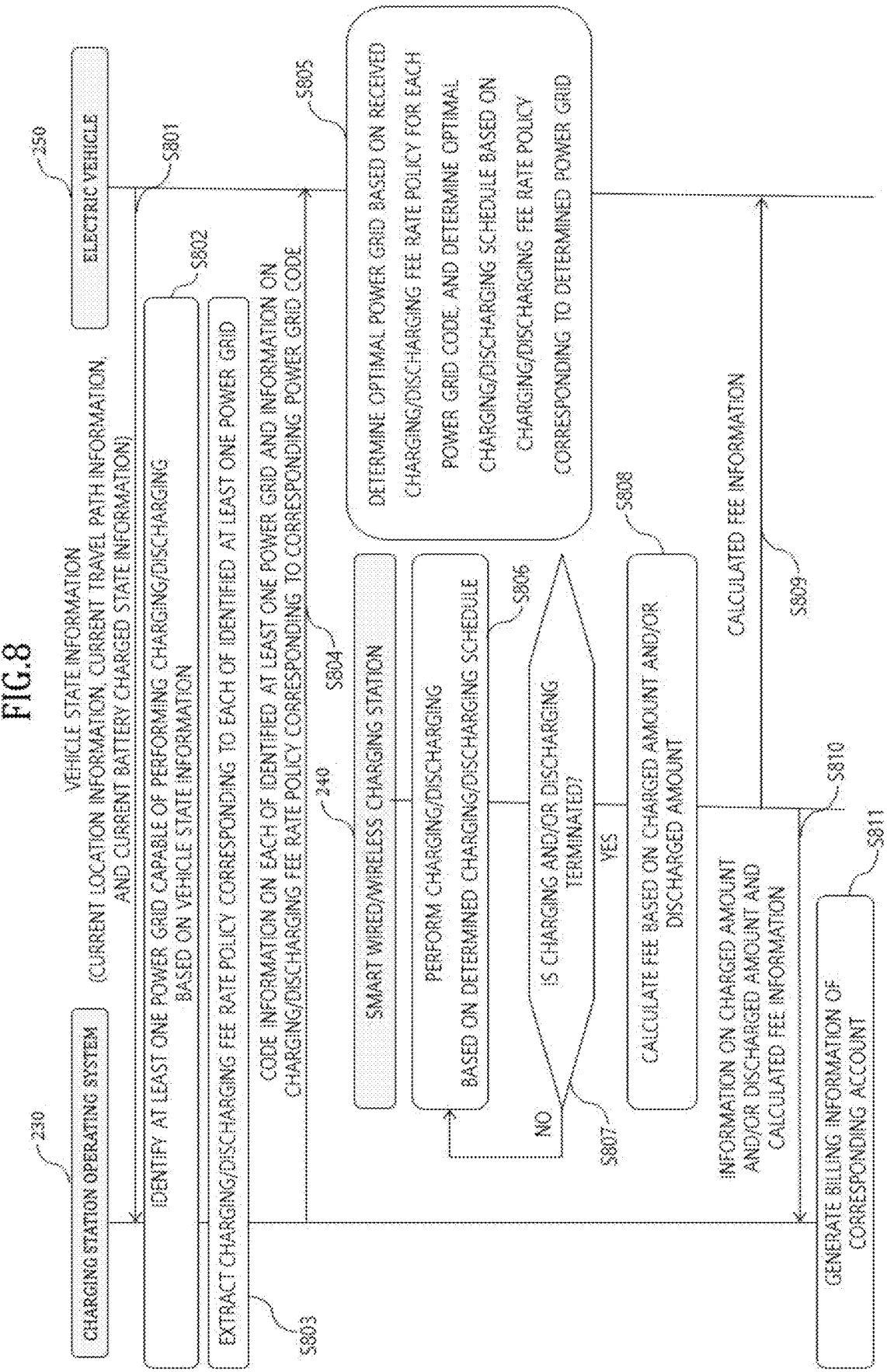
FIG. 8 is a flowchart for illustrating a charging/discharging procedure of an electric vehicle according to another embodiment of the present disclosure.

FIG. 8 is a flowchart for illustrating a charging/discharging procedure of an electric vehicle according to another embodiment of the present disclosure.

In detail, FIG. 8 is a flowchart for illustrating a procedure for controlling the charging/discharging based on the charging/discharging schedule of the electric vehicle determined based on the charging/discharging fee rate policy for each power grid code in the V2G system.

Referring to FIG. 8, the electric vehicle 250 may transmit the vehicle travel state information to the charging station operating system 230 via the network 260 (S801). As an example, the vehicle state information may include at least one of the current location information of the corresponding vehicle, the information on the current travel path, and the information on the current battery charged state, but may not be limited thereto, and may further include at least one of information on a travel speed of the vehicle, information on power consumed per unit time (kWh), and information on a user preferred power grid.

The charging station operating system 230 may identify at least one power grid capable of performing the charging/discharging corresponding to the vehicle state information of the electric vehicle 250, and extract information on a charging/discharging fee rate policy corresponding to each of the identified at least one power grid from the internal database (S802 to S803). In this regard, the charging/discharging fee rate policy may be dynamically updated by the charging station operating system 230 based on a power demand prediction for each power grid, but this is only one embodiment, and may be updated in response to the request of the power grid or the request of the operator of the smart wired/wireless charging station 240.

The charging station operating system 230 may transmit code information on the identified at least one power grid and the information on the charging/discharging fee rate policy extracted corresponding to the corresponding power grid code to the electric vehicle 250 (S804).

The electric vehicle 250 may determine an optimal power grid based on the received charging/discharging fee rate policy for each power grid code, and determine an optimal charging/discharging schedule based on a charging/discharging fee rate policy corresponding to the determined power grid (S805). The electric vehicle 250 according to an embodiment may determine the optimal power grid for the charging/discharging further based on the travel plan input by the user, and determine the optimal charging/discharging schedule based on the charging/discharging fee rate policy of the determined power grid.

The electric vehicle 250 may perform the charging/discharging with the smart wired/wireless charging station 240 based on the determined charging/discharging schedule (S806).

The smart wired/wireless charging station 240 may calculate the charged amount and/or the discharged amount when the charging and/or the discharging is terminated, and calculate the fee based on the calculated charged amount and/or discharged amount (S807 to S808).

The smart wired/wireless charging station 240 may transmit the calculated fee information to the electric vehicle 250 (S809).

In addition, the smart wired/wireless charging station 240 may transmit the billing request message containing the charged amount and/or the discharged amount calculated corresponding to the electric vehicle 250 and the calculated fee information to the charging station operating system 230 (S810).

The charging station operating system 230 may identify the account based on the received billing request message, and generate the billing information corresponding to the identified account (S811).

The charging station operating system 230 according to an embodiment may perform the automatic payment based on the generated billing information, and transmit the automatic payment result to the electric vehicle 250 or the user terminal (not shown) in association with the electric vehicle 250.

Figure 9:
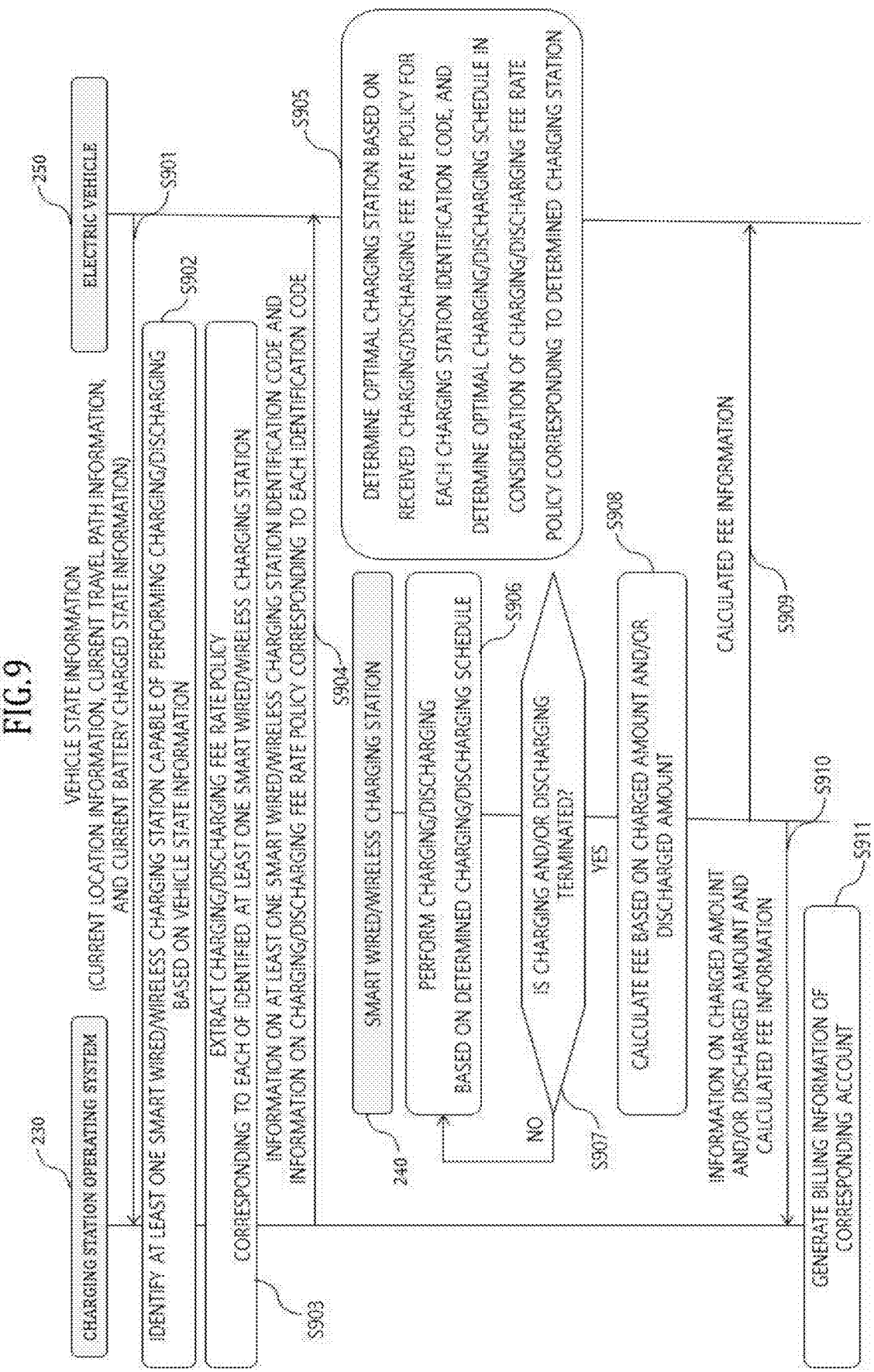
FIG. 9 is a flowchart for illustrating a charging/discharging procedure of an electric vehicle according to another embodiment of the present disclosure.

FIG. 9 is a flowchart for illustrating a charging/discharging procedure of an electric vehicle according to another embodiment of the present disclosure.

In detail, FIG. 9 is a flowchart for illustrating a procedure for controlling the charging/discharging based on the charging/discharging schedule of the electric vehicle determined based on a predefined charging/discharging fee rate policy for each smart wired/wireless charging station identification code in the V2G system.

Referring to FIG. 9, the electric vehicle 250 may transmit the vehicle travel state information to the charging station operating system 230 via the network 260 (S901). As an example, the vehicle state information may include at least one of the current location information of the corresponding vehicle, information on a current travel path (or a destination) set in the navigation system, and information on the current battery charged state—for example, the current battery residual quantity-, but may not be limited thereto, and may further include at least one of information on a current travel speed (or an average travel speed per unit time) of the vehicle, information on a name of a road (and/or a type of the road) where the vehicle is currently traveling, information on power consumed per unit time (kWh), and information on the user preferred power grid and/or charging station.

The charging station operating system 230 may identify at least one smart wired/wireless charging station capable of performing charging/discharging corresponding to the vehicle state information of the electric vehicle 250, and extract information on a predefined charging/discharging fee rate policy corresponding to each of the identified at least one smart wired/wireless charging station from the internal database (S902 to S903). In this regard, the charging/discharging fee rate policy may be dynamically updated by the charging station operating system 230 based on the power demand prediction for each smart wired/wireless charging station, but this is only one embodiment. In another embodiment, the charging/discharging fee rate policy may be updated in response to the request of the operator of the smart wired/wireless charging station.

The charging station operating system 230 may transmit information on an identification code corresponding to each of the identified at least one smart wired/wireless charging station and information on a charging/discharging fee rate policy extracted corresponding to the corresponding identification code to the electric vehicle 250 (S904).

The electric vehicle 250 may determine an optimal charging station based on the received charging/discharging fee rate policy for each smart wired/wireless charging station identification code, and determine an optimal charging/discharging schedule based on the charging/discharging fee rate policy corresponding to the determined charging station (S905). The electric vehicle 250 according to an embodiment may determine the optimal charging station for the charging/discharging further based on a travel path selected corresponding to destination information input by the user via predetermined input means on the navigation system 330, and determine the optimal charging/discharging schedule based on the charging/discharging fee rate policy of the determined charging station.

The electric vehicle 250 may perform the charging/discharging with the smart wired/wireless charging station 240 based on the determined charging/discharging schedule (S906).

The smart wired/wireless charging station 240 may calculate the charged amount and/or the discharged amount when the charging and/or the discharging is terminated, and calculate the fee based on the calculated charged amount and/or discharged amount (S907 to S908).

The smart wired/wireless charging station 240 may transmit the calculated fee information to the electric vehicle 250 (S909).

In addition, the smart wired/wireless charging station 240 may transmit the billing request message containing the charged amount and/or the discharged amount calculated corresponding to the electric vehicle 250 and the calculated fee information to the charging station operating system 230 (S910).

The charging station operating system 230 may identify the account based on the received billing request message, and generate the billing information corresponding to the identified account (S911).

The charging station operating system 230 according to an embodiment may perform the automatic payment based on the generated billing information, and transmit the automatic payment result to the electric vehicle 250 or the user terminal (not shown) in association with the electric vehicle 250.

Figure 10:
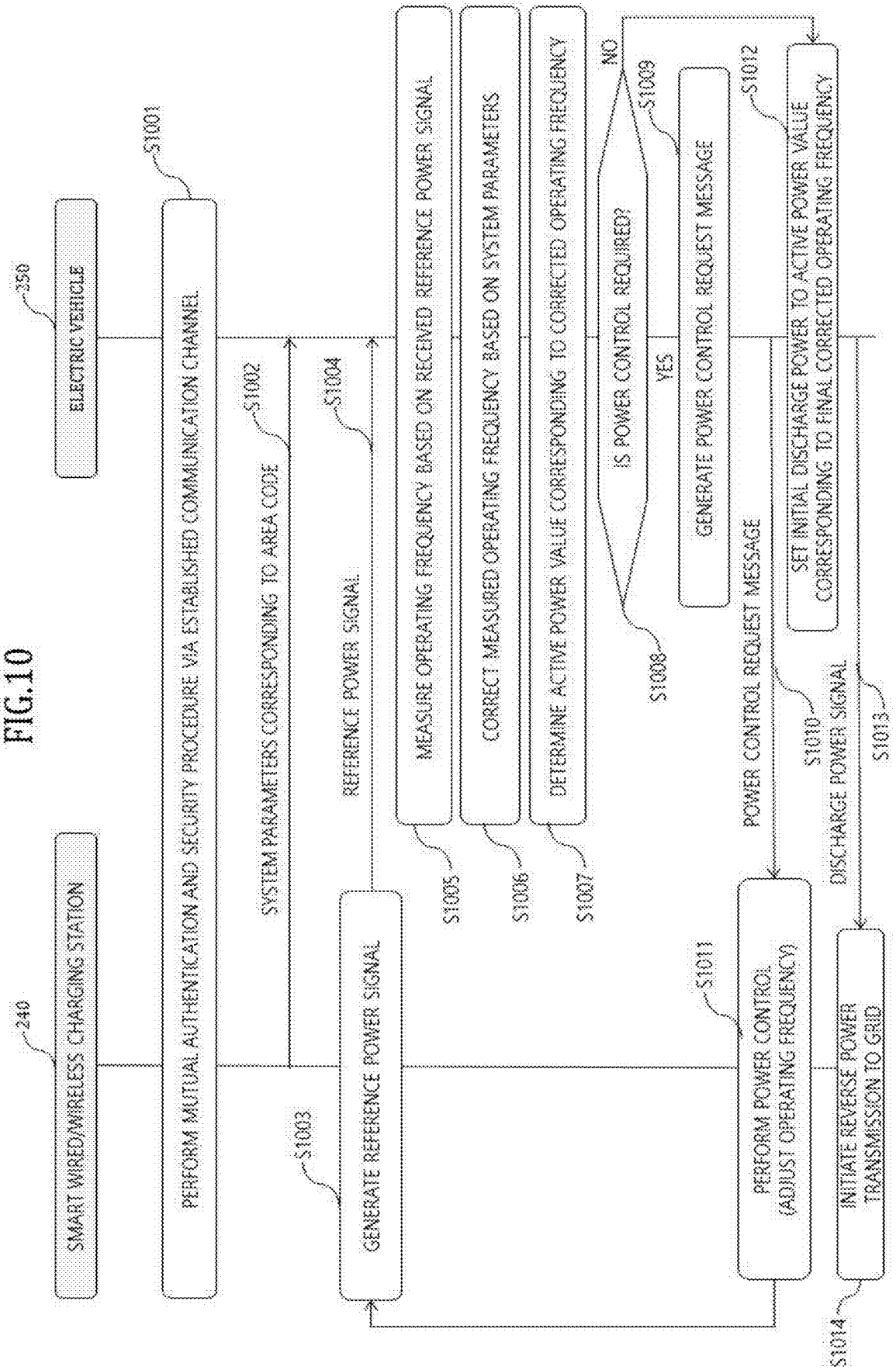
FIG. 10 is a flowchart for illustrating a charging/discharging procedure of an electric vehicle according to another embodiment of the present disclosure.

FIG. 10 is a flowchart for illustrating a charging/discharging procedure of an electric vehicle according to another embodiment of the present disclosure.

In detail, FIG. 10 is a flowchart for illustrating a procedure of performing the parameter correction for the system protection based on system parameter information corresponding to the area code obtained from the smart wired/wireless charging station 240 and performing the discharging of the electric vehicle 250 by performing the power control based on the corrected parameters.

Referring to FIG. 10, the smart wired/wireless charging station 240 may establish a communication channel with the detected electric vehicle 250, and perform mutual authentication and security procedure via predetermined signaling (S1001).

The smart wired/wireless charging station 240 according to an embodiment may determine the charging/discharging mode via power transmission negotiation with the electric vehicle 250 when the mutual authentication and the security procedure are successfully completed. In this regard, the charging/discharging mode may include the wired charging/discharging mode and the wireless charging/discharging mode. The smart wired/wireless charging station 240 may dynamically determine an optimal charging/discharging mode based on at least one of the travel state, a charging/discharging capability, a required amount of power for the charging/discharging, the battery residual quantity, and a charging/discharging available time of the electric vehicle 250. As an example, the travel state may be classified into a stop state and a traveling state. As an example, the charging/discharging capability may include information on whether the wired charging/discharging is possible and information on whether the wireless charging/discharging is possible. The charging/discharging available time may be determined based on the predetermined charging/discharging schedule of the electric vehicle 250.

When the mutual authentication and the security procedure of the smart wired/wireless charging station 240 are successfully completed, system parameters corresponding to a corresponding area code may be transmitted to the electric vehicle 250 (S1002).

The smart wired/wireless charging station 240 may generate the predetermined reference power signal and transmit the reference power signal to the electric vehicle 250 (S1003 to S1004).

The electric vehicle 250 may measure the operating frequency based on the received reference power signal (S1005).

The electric vehicle 250 may correct the measured operating frequency based on the system parameters (S1006).

The electric vehicle 250 may determine (or calculate) the active power value corresponding to the corrected operating frequency based on the pre-stored operating frequency/active power value mapping table or the predefined equation (S1007).

The electric vehicle 250 may determine whether the power control is required based on a result of comparison between the determined active power value and an active power value included in the system parameters (S1008).

When the power control is required as a result of the determination, the electric vehicle 250 may generate a power control request message and transmit the message to the smart wired/wireless charging station 240 (S1009 to S1010). In this regard, the power control request message may contain a control error value determined based on a difference value between the determined active power value and the active power value included in the system parameters.

The smart wired/wireless charging station 240 may perform the power control by adjusting the operating frequency based on the control error value contained in the power control request message (S1011). Thereafter, the smart wired/wireless charging station 240 may transmit a power-controlled reference power signal.

The electric vehicle 250 may perform the above-described operations S1005 to S1007 on the reference power signal received after the power control request so as to determine again whether the power control is required.

When the power control is no longer required as a result of the determination, the electric vehicle 250 may set initial discharge power to an active power value corresponding to the final corrected operating frequency to perform power transmission—that is, discharge power signal transmission—to the smart wired/wireless charging station 240 (S1012 to S1013).

The smart wired/wireless charging station 240 may convert the power received from the electric vehicle 250 into power required for a corresponding grid and reversely transmit the converted power (S1014).

Figure 11:
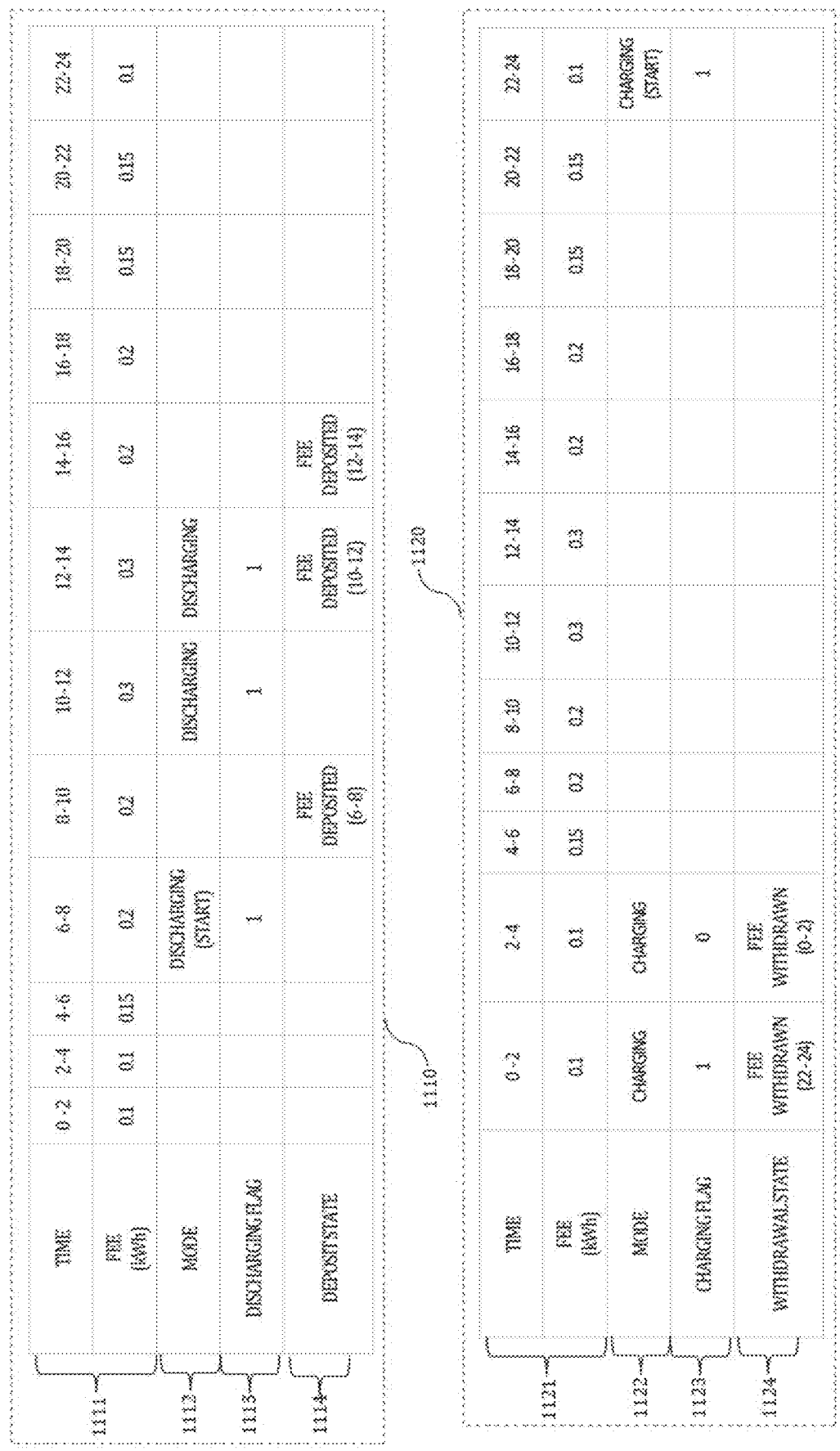
FIG. 11 shows a charging/discharging scheduling table based on a charging/discharging fee rate policy corresponding to an area code according to an embodiment of the present disclosure.

FIG. 11 shows a charging/discharging scheduling table based on a charging/discharging fee rate policy corresponding to an area code according to an embodiment of the present disclosure.

Referring to FIG. 11, 0x17 may be predefined as an area code (or a country code) for Austria, and a fee rate for each of the charging and the discharging may be defined differently based on a time period.

As shown in FIG. 11, the charging/discharging scheduling table may be composed of a discharging scheduling table 1110 and a charging scheduling table 1120.

The discharging scheduling table 1110 may be composed of a discharging fee rate field 1111 for indicating a discharging fee rate for each time period, a discharging mode field 1112 for indicating a time period to be in the discharging mode and a discharging start time period, a discharging flag field 1113 for indicating whether the actual discharging has been performed in the corresponding time period, and a deposit state field 1114 for identifying whether deposit of a fee to a vehicle owner's account has been completed for the discharging performed in the corresponding time period.

The charging scheduling table 1120 may be composed of a charging fee rate field 1121 for indicating a charging fee rate for each time period, a charging mode field 1122 for indicating a time period to be in the charging mode and a charging start time period, a charging flag field 1123 for indicating whether the actual charging has been performed in the corresponding time period, and a withdrawal state field 1124 for identifying whether withdrawal of a fee from the vehicle owner's account has been completed for the charging performed in the corresponding time period.

Referring to the reference numeral 1120, a 2-4 time period was pre-scheduled as a charging time period, but a charging flag value is "0", which means that the actual charging is not performed.

As shown in FIG. 11, at least one of the charging time periods and the discharging time periods may not be set as continuous time periods.

FIG. 12 shows a charging/discharging scheduling table based on a charging/discharging fee rate policy corresponding to a power grid code according to an embodiment of the present disclosure.

Referring to FIG. 12, 0x17 may be predefined as the area code (or the country code) for Austria, and there may be a plurality of power grids capable of performing the charging/discharging in Austria. Charging/discharging fee rates of the respective power grids may be defined to be different from each other based on policies for the respective power grids.

The charging/discharging scheduling table according to an embodiment may be formed by integrating both the discharging schedule and the charging schedule.

Referring to FIG. 12, a charging/discharging scheduling table 1200 may be composed of a fee rate field 1201 for indicating a fee rate for each time period of each power grid, a mode field 1202 for indicating which mode among the discharging and the charging each time period to be in, a discharging flag field 1203 for indicating whether the actual discharging has been performed in the corresponding time period, a charging flag field 1204 for indicating whether the actual charging has been performed in the corresponding time period, and a deposit and withdrawal state field 1205 for identifying whether the deposit or the withdrawal of the fee to or from the vehicle owner's account has been completed for the discharging of the charging performed in the corresponding time period.

In the present embodiment, power grids capable of performing the charging/discharging for the corresponding electric vehicle may include a power grid 1 (code: 0x2a), a power grid 2 (code: 0x2b), and a power grid 3 (code: 0x2c). The electric vehicle 250 may determine an optimal power grid for the charging/discharging as the power provider 3 based on the fee rate for each power grid.

Referring to the reference numeral 1200, it is shown that a 12-14 time period was pre-scheduled as a discharging time period and the actual discharging was performed, but a fee for the corresponding discharging has not yet been deposited.

The charging/discharging schedule according to FIG. 12 shows that the charging time periods and the discharging time periods are set as continuous time periods, but this is only one embodiment, and may be set discontinuously based on a preset travel plan (or a travel pattern recognized via prior learning) of the corresponding vehicle.

FIG. 13 shows a charging/discharging scheduling table based on a charging/discharging fee rate policy corresponding to a charging station identification code according to an embodiment of the present disclosure.

Referring to FIG. 13, 0x17 may be predefined as the area code (or the country code) for Austria, and a power grid code for a power grid capable of performing the charging/discharging in Austria may be defined as 0x2c. A plurality of smart wired/wireless charging stations may be operated for each power grid, and charging/discharging fee rates for the smart wired/wireless charging stations may be defined to be different from each other based on a policy of the power grid or a policy of an operator of the charging station.

The charging/discharging scheduling table according to the embodiment of FIG. 13 may be formed by integrating both the discharging schedule and the charging schedule.

Referring to FIG. 13, a charging/discharging scheduling table 1300 may be composed of a fee rate field 1301 for indicating a fee rate for each time period of each charging station, a mode field 1302 for indicating which mode among the discharging and the charging each time period to be in, a discharging flag field 1303 for indicating whether the actual discharging has been performed in the corresponding time period, a charging flag field 1304 for indicating whether the actual charging has been performed in the corresponding time period, and a deposit and withdrawal state field 1305 for identifying whether the deposit or the withdrawal of the fee to or from the vehicle owner's account has been completed for the discharging of the charging performed in the corresponding time period.

In the present embodiment, smart wired/wireless charging stations capable of performing the charging/discharging for the corresponding electric vehicle may include a charging station 1 (code: 0x3a), a charging station 2 (code: 0x3b), and a charging station 3 (code: 0x3c). The electric vehicle 250 may determine an optimal charging station for the charging/discharging based on the fee rate for each charging station. In the present embodiment, a case in which the charging station 3 is determined as the optimal charging/discharging station will be described as an example.

Referring to the reference numeral 1300, it is shown that a 12-14 time period was pre-scheduled as a discharging time period and the actual discharging was performed, but a fee for the corresponding discharging has not yet been deposited. In addition, it is shown that a 2-4 time period was pre-scheduled as a charging time period and the actual charging was performed, but a fee for the corresponding charging has not yet been withdrawn.

The charging/discharging schedule according to FIG. 13 shows that the charging time periods and the discharging time periods are set as continuous time periods, but this is only one embodiment, and may be set discontinuously based on the preset travel plan (or the travel pattern recognized via the prior learning) of the corresponding vehicle.

FIG. 14 is a flowchart for illustrating a charging/discharging scheduling method for an electric vehicle according to an embodiment of the present disclosure.

Referring to FIG. 14, the electric vehicle 250 may receive the information on the charging/discharging fee rate policy for each area (or country) and/or power grid and/or charging station from the charging station operating system 230 and/or a power grid server (not shown) and/or the smart wired/wireless charging station 240 (S1401). In this regard, the information on the charging/discharging fee rate policy may be received by being mapped to at least one of the area code (or the country code), the power grid code, and the charging station identification code.

The electric vehicle 250 may receive the information on the travel pattern thereof from the charging station operating system 230 or the separate cloud server (not shown) (S1402). As an example, the travel pattern may be analyzed via prior learning of big data based on the travel information collected in advance for the corresponding vehicle. As an example, the travel pattern may include information on a traveling time period and a stop time period in units of years/months/weeks/days, but may not be limited thereto, and may further include information on an average travel distance and an average power consumption for each time period in units of years/months/weeks/days.

The electric vehicle 250 may predict a time period in which the charging/discharging may be performed based on the information on the travel pattern (S1403).

The electric vehicle 250 may determine optimal area code (or country code) and/or power grid code and/or charging station identification code for the charging/discharging based on the predicted charging/discharging available time period and the charging/discharging fee rate policy (S1404).

The electric vehicle 250 may generate a charging/discharging scheduling table based on a charging/discharging fee rate policy corresponding to the determined code (S1405).

The electric vehicle 250 may perform the charging/discharging based on the charging/discharging scheduling table and then update the charging/discharging scheduling table based on the charging/discharging performance result (S1406). In this regard, the updated information may include information on whether the actual charging/discharging has been performed for each scheduled charging/discharging time period, and information on whether the payment of the fee for the corresponding charging/discharging has been completed.

In the above embodiment, it has been described that the electric vehicle 250 determines the charging/discharging schedule by itself, but this is only one embodiment. In another embodiment, the charging station operating system 230 may determine the charging/discharging schedule for the corresponding electric vehicle 250, and transmit information on the determined charging/discharging schedule to the electric vehicle 250. In this case, the charging station operating system 230 may perform the charging/discharging scheduling further based on at least one of the information on the travel pattern analyzed in advance for the electric vehicle 250, wired/wireless charging capability information of the electric vehicle 250, the current location information of the electric vehicle 250, the information on the travel path set via the navigation system 330 of the electric vehicle 250, information on the current battery charged state of the electric vehicle 250, information on the future travel plan input by the user, statistics information of an amount of electricity used for each time period in units of quarters/months/weeks/days pre-collected for each power grid and/or smart wired/wireless charging station, and information on whether the smart wired/wireless charging station is malfunctioning in addition to a current charging/discharging fee rate policy for each area/power grid/charging station.

Figure 15:
FIG. 15 is a flowchart for illustrating a method for performing charging/discharging scheduling of an electric vehicle via association with a server according to an embodiment of the present disclosure.

FIG. 15 is a flowchart for illustrating a method for performing charging/discharging scheduling of an electric vehicle via association with a server according to an embodiment of the present disclosure.

Referring to FIG. 15, the electric vehicle 250 may transmit the information on the current location measured using equipped positioning means and/or the travel path (or the destination) set by the user via the navigation system 330 to the server. (S1501). In this regard, the server may be the charging station operating system 230 in FIG. 2 described above, but this is only one embodiment, and may be another server—for example, the cloud server-connected to the network 260.

The electric vehicle 250 may receive, from the server, information on at least one power grid code corresponding to the current location and/or the travel path (or the destination), information on a charging/discharging fee rate policy corresponding to each of the at least one power grid code, and information on the system parameters (S1502).

The electric vehicle 250 may determine an available charging/discharging time period thereof based on the pre-analyzed travel pattern and/or the travel plan set by the user (S1503).

The electric vehicle 250 may select a power grid leading to an optimal fee based on the determined available charging/discharging time period and the charging/discharging fee rate policy for each power grid code, and determine the charging/discharging schedule based on a charging/discharging fee rate policy of the selected power grid (S1504).

The electric vehicle 250 may transmit a predetermined charging station recommendation request message containing charging/discharging capability information thereof, information on the selected power grid code, and information on the travel path set by the user to the server (S1505).

The electric vehicle 250 may receive, from the server, location information—or charging station identification code information—of a charging station recommended by the server in response to the charging station recommendation request message.

The electric vehicle 250 may input the location information- or the charging station identification code information—of the charging station to the navigation system 330 and then move to the corresponding charging station to receive initial power signal—that is, reference power signal—from the charging station (S1507). When the location information of the charging station is input, the electric vehicle 250 according to an embodiment may switch to an autonomous driving travel mode and move to the charging station.

The electric vehicle 250 may correct the system parameters based on the reference power signal measurement result and then perform the charging/discharging with the charging station based on the determined charging/discharging schedule (S1508).

Figure 16:
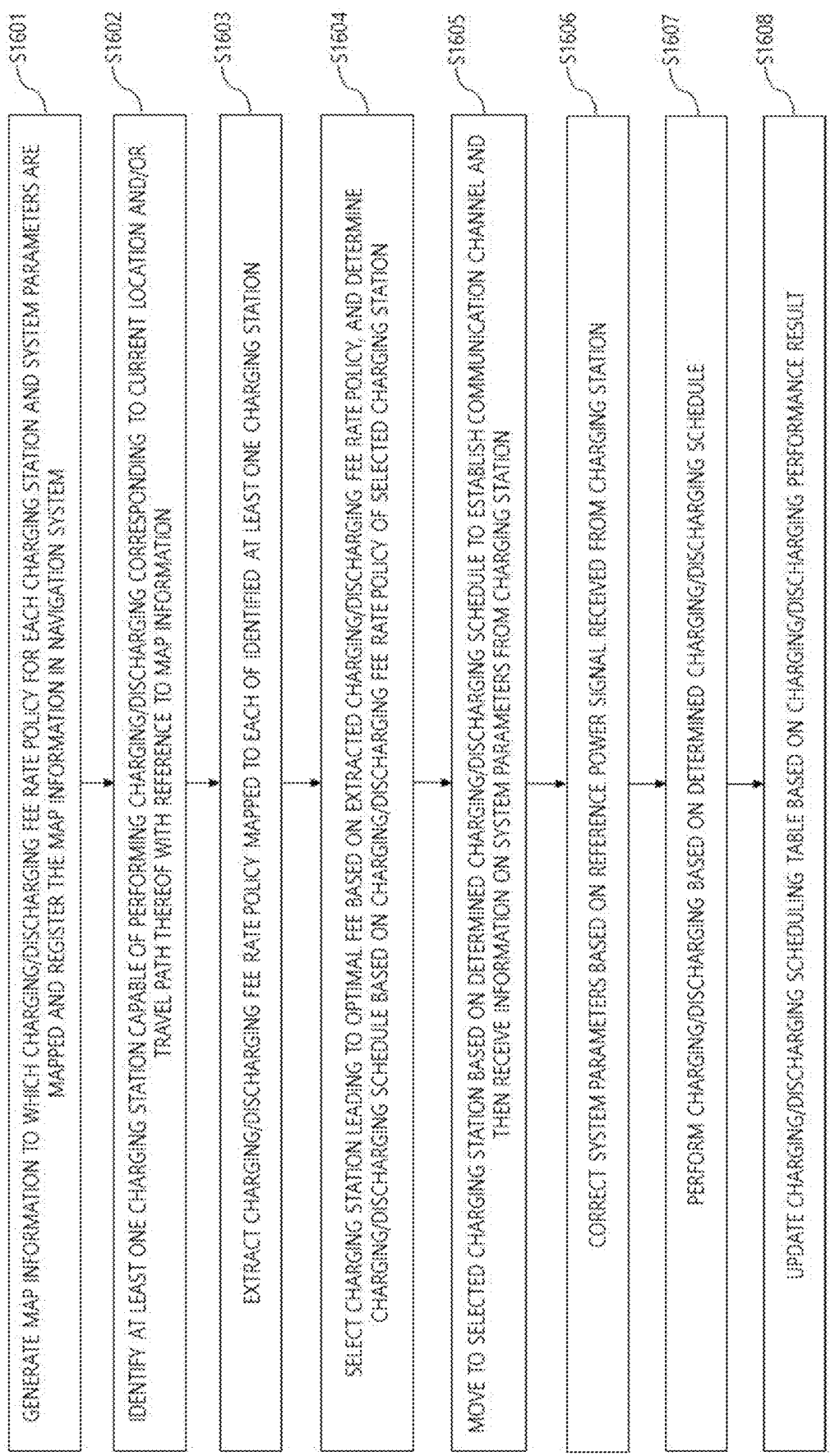
FIG. 16 is a flowchart for illustrating a charging/discharging scheduling method of an electric vehicle utilizing navigation information according to an embodiment of the present disclosure.

FIG. 16 is a flowchart for illustrating a charging/discharging scheduling method of an electric vehicle utilizing navigation information according to an embodiment of the present disclosure.

Referring to FIG. 16, the electric vehicle 250 may generate map information to which the charging/discharging fee rate policy for each charging station and the system parameters are mapped and register the map information in the navigation system 330 thereof (S1601).

The electric vehicle 250 may identify at least one charging station capable of performing the charging/discharging corresponding to the current location and/or the travel path thereof with reference to the map information (S1602).

The electric vehicle 250 may extract a charging/discharging fee rate policy mapped to each of the identified at least one charging station (S1603).

The electric vehicle 250 may select a charging station leading to the optimal fee based on the extracted charging/discharging fee rate policy, and determine the charging/discharging schedule based on a charging/discharging fee rate policy corresponding to the selected charging station (S1604).

The electric vehicle 250 may move to the selected charging station based on the determined charging/discharging schedule to establish a communication channel and then receive information on the system parameters from the charging station (S1605). In an embodiment, the information on the system parameters may be pre-mapped to the charging station when the map is generated in the operation S1601.

The electric vehicle 250 may correct the system parameters based on the reference power signal received from the charging station (S1606). In this regard, the reference power signal may be received by being set as power relatively lower than a power signal for the actual charging/discharging.

The electric vehicle 250 may perform the charging/discharging based on the determined charging/discharging schedule (S1607).

The electric vehicle 250 may update the charging/discharging scheduling table based on the charging/discharging performance result (S1608).

Figure 17:
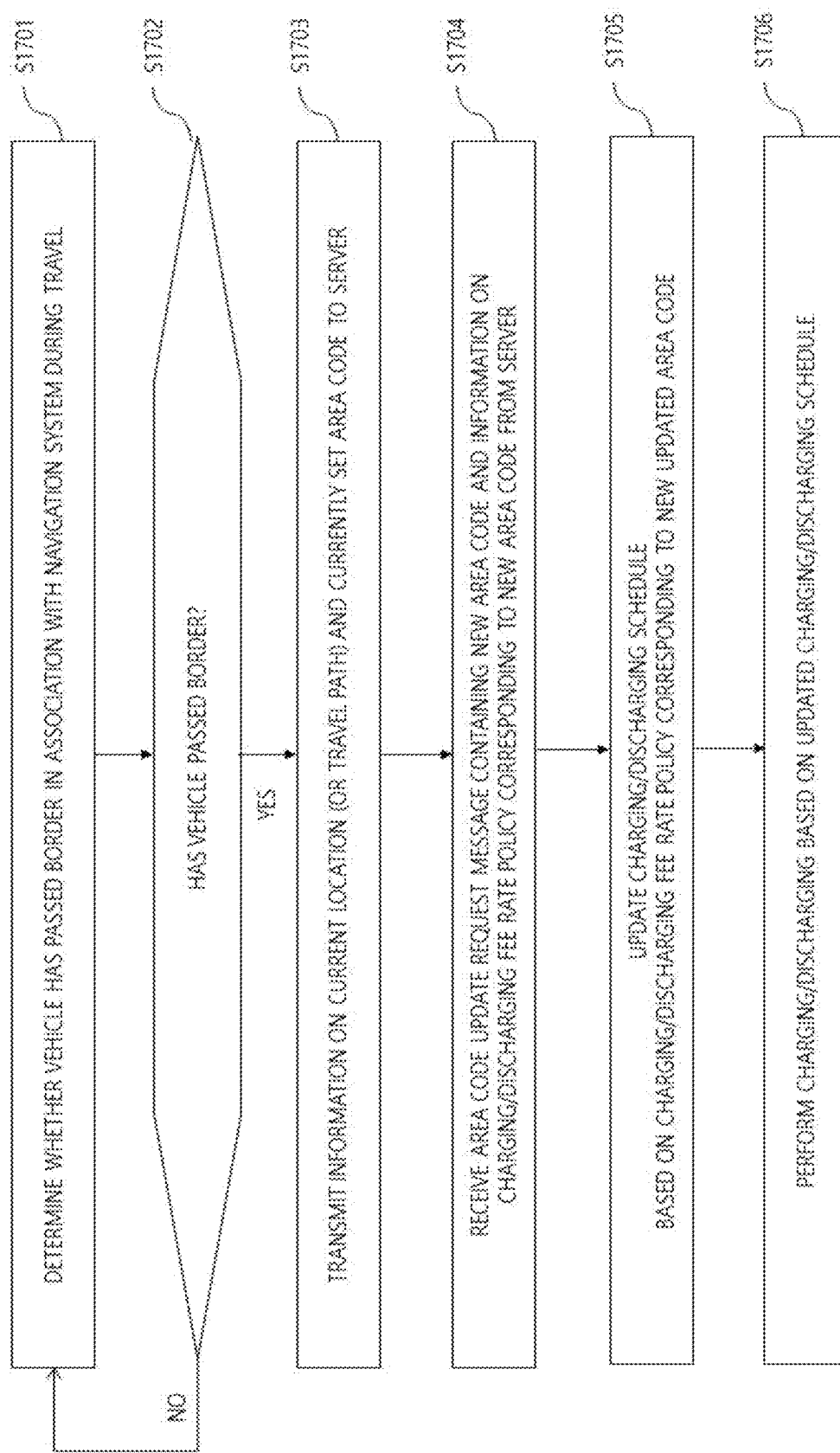
FIG. 17 is a flowchart for illustrating a charging/discharging scheduling method of an electric vehicle based on border entry according to an embodiment of the present disclosure.

FIG. 17 is a flowchart for illustrating a charging/discharging scheduling method of an electric vehicle based on border entry according to an embodiment of the present disclosure.

Referring to FIG. 17, the electric vehicle 250 may determine whether the vehicle has passed the border in association with the navigation system 330 during the travel (S1701).

When the vehicle has passed the border as a result of the determination, the electric vehicle 250 may transmit the information on the current location (or the current travel path) and the currently set area code to the server via the network 260 (S1702 to S1703). As an example, the server may be the charging station operating system 230 in FIG. 2 described above, but may not be limited thereto, and may be the separate cloud server connected to the network 260. In this regard, the cloud server may be in association with the charging station operating system 230 via the network 260.

The electric vehicle 250 may receive an area code update request message containing a new area code and information on a charging/discharging fee rate policy corresponding to the new area code from the server (S1704).

The electric vehicle 250 may update the previously set area code and then update the previously set charging/discharging schedule by determining a new charging/discharging schedule based on the charging/discharging fee rate policy corresponding to the new updated area code (S1705). In this regard, a detailed description of the method for determining the charging/discharging schedule will be replaced with the description of the above-described drawings.

The electric vehicle 250 may perform the charging/discharging based on the updated charging/discharging schedule (S1706).

In an embodiment, the charging/discharging fee rate policy corresponding to the new area code may be dynamically updated based on power consumption statistical information for each time period in units of quarters/months/weeks/days of a country corresponding to the corresponding area code. In this regard, the electric vehicle 250 may receive a predetermined charging/discharging fee rate update request message containing information on the charging/discharging fee rate policy updated corresponding to the new area code from the server. The electric vehicle 250 may update the charging/discharging schedule based on the charging/discharging fee rate update request message.

The electric vehicle 250 according to an embodiment may obtain information on a charging station capable of performing the charging/discharging from the server corresponding to the current location (or travel path). The server may obtain vehicle state information of the electric vehicle 250. In this case, the server may determine and recommend an optimal charging station for the corresponding electric vehicle 250 based on the vehicle state information. In this regard, a detailed description of the vehicle state information will be replaced with the description of the above-described drawings.

The server may provide information on the charging station to be recommended—for example, a charging station identification code, detailed location information of the charging station, and the like- to the electric vehicle 250.

When the charging time period or the discharging time period has come based on the updated charging/discharging schedule, the electric vehicle 250 may move to the corresponding charging station and automatically perform the charging/discharging. As an example, when the charging time period or the discharging time period has come, the electric vehicle 250 may be automatically switched to the autonomous driving mode, and may perform the autonomous driving based on the location information of the charging station set in the navigation system 330 to move to the corresponding charging station.

When system parameters corresponding to the area code to be updated based on the border entry are different from the system parameters corresponding to the preset area code, the server according to an embodiment may transmit information on the system parameters corresponding to the new area code to the electric vehicle 250. In this regard, a description of the types of the system parameters and the method for correcting the system parameters will be replaced with the description of the above-described drawings.

The server according to an embodiment may determine in which country it is advantageous in terms of cost to perform the charging/discharging based on the charging/discharging fee rate policy for each area code of the corresponding country when the electric vehicle 250 arrives at an area near the border. The server may determine the country advantageous in terms of the cost, and transmit the determination result to the electric vehicle 250. Therefore, the user of the electric vehicle 250 may perform the charging/discharging in the country leading to the optimal fee.

The various embodiments according to the present disclosure have the advantage of providing the method for charging/discharging the electric vehicle, and the device and the system therefor.

In addition, the various embodiments according to the present disclosure have the advantage of minimizing the vehicle maintenance cost by performing the charging/discharging scheduling optimized for the current location and the travel path of the electric vehicle.

In addition, the various embodiments according to the present disclosure have the advantage of minimizing the charging fee by adaptively setting the wired/wireless charging/discharging schedule of the electric vehicle based on the charging/discharging fee rate policy different for each area/power grid/charge point.

In addition, the various embodiments according to the present disclosure have the advantage of being able to safely protect the power system by dynamically correcting the system parameters for each area/power grid/charge point based on the current location and/or the travel plan of the electric vehicle.

In addition, the various embodiments according to the present disclosure have the advantage of enabling the stable power supply by minimizing the load fluctuation of the power system by reversely transmitting the active power charged in the battery of the electric vehicle to the power system.

In addition, the various embodiments according to the present disclosure have the advantage of effectively solving the problem of battery deterioration caused by the frequent battery charging/discharging by providing the optimal charging/discharging scheduling for the electric vehicle.

In addition, the various embodiments according to the present disclosure have the advantage of effectively distributing the power demand because the charging/discharging fee rate may be automatically updated and applied by predicting the power demand for each area/power grid/charge point/time period in real time based on the big data-based prior learning.

In addition, various effects directly or indirectly identified through this document may be provided.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation.

Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for controlling charging and discharging of a battery for an electric vehicle comprising an electric vehicle charging controller, the method comprising:
generating, by the charging controller, map information comprising a charging/discharging fee rate policy for each mapped charging station and registering the generated map information in a vehicle;
identifying, by the charging controller, one or more charging stations capable of performing charging/discharging operations corresponding to a current location of the vehicle based on the map information;
extracting, by the charging controller, a charging/discharging fee rate policy mapped to each of the identified one or more charging stations;
selecting, by the charging controller, a charging station leading to an optimal fee based on the extracted charging/discharging fee rate policy;
determining, by the charging controller, a charging/discharging schedule based on a charging/discharging fee rate policy of the selected charging station;
moving, by the charging controller, to the selected charging station based on the determined charging/discharging schedule and receiving, from the selected charging station, information on system parameters corresponding to an area code corresponding to a current location;
correcting, by the charging controller, the system parameters based on a power signal received from the selected charging station,
wherein the system parameters include an operating frequency value and an active power value,
wherein the operating frequency value is corrected by comparing a received operating frequency value with a measured operating frequency value measured from the power signal, and
wherein the active power value is corrected by comparing a received active power value with a measured active power value measured from the power signal; and
performing, by the charging controller, the charging/discharging based on the determined charging/discharging schedule at the selected charging station.

2. The method of claim 1,
wherein the selecting of the charging station leading to the optimal fee comprises:
determining an available charging/discharging time period; and
determining a charging station leading to an optimal fee based on a charging/discharging fee rate of each of the identified one or more charging stations of the determined available charging/discharging time period.

3. The method of claim 1, further comprising:
correcting the system parameters based on a measurement result for the power signal received from the selected charging station,
wherein the system parameters are received from a server connected via the selected charging station or a network.

4. The method of claim 1,
wherein the determining of the charging/discharging schedule comprises:
determining a discharging time period leading to a maximum fee based on the charging/discharging fee rate policy of the selected charging station;
determining a charging time period leading to a minimum fee based on the charging/discharging fee rate policy of the selected charging station; and
generating a charging/discharging scheduling table based on the determined discharging time period and the determined charging time period.

5. The method of claim 4,
wherein the charging/discharging scheduling table comprises one or more of:
a fee rate field indicating a fee rate for the determined charging time period and the determined discharging time period;
a mode field indicating a time period to be in a discharging mode, a discharging start time period, a time period to be in a charging mode, and a charging start time period;
a charging/discharging flag field indicating whether actual discharging or charging has been performed in a corresponding time period; and
a deposit and withdrawal state field indicating whether deposit or withdrawal of a fee to or from a user account has been completed for the discharging or the charging performed in the corresponding time period.

6. The method of claim 4,
wherein the charging/discharging fee rate policy is dynamically updated based on power consumption statistics information for the determined charging time period and the determined discharging time period of the selected charging station.

7. The method of claim 1,
wherein the determining of the charging/discharging schedule further comprises basing the determined charging/discharging schedule on one or more of a future travel plan set by a user, a pre-analyzed travel pattern, and a current battery charged state.

8. The method of claim 7, further comprising:
transmitting vehicle state information to a server via a network; and
receiving the pre-analyzed travel pattern from the server,
wherein the pre-analyzed travel pattern is determined by the server, in advance, based on the vehicle state information.

9. The method of claim 8, wherein the vehicle state information comprises one or more of location information of the vehicle, information on a travel path set in a navigation system, information on the current battery charged state, information on a travel speed, information on a road where the vehicle is traveling, information on battery power consumed per unit time, and information on preferred power grid and charging station of the user.

10. A non-transitory, machine-readable storage medium comprising executable instructions that, when executed by a processing system including a processor, facilitate performance of operations comprising:
generating map information comprising a charging/discharging fee rate policy for each mapped charging station and registering the generated map information in a vehicle;
identifying one or more charging stations capable of performing charging/discharging operations corresponding to a current location of the vehicle based on the map information;
extracting a charging/discharging fee rate policy mapped to each of the identified one or more charging stations;
selecting a charging station leading to an optimal fee based on the extracted charging/discharging fee rate policy;
determining a charging/discharging schedule based on a charging/discharging fee rate policy of the selected charging station;
moving to the selected charging station based on the determined charging/discharging schedule and receiving, from the selected charging station, information on system parameters corresponding to an area code corresponding to a current location;
correcting the system parameters based on a reference-power signal received from the selected charging station,
wherein the system parameters include an operating frequency value and an active power value,
wherein the operating frequency value is corrected by comparing a received operating frequency value with a measured operating frequency value measured from the power signal, and
wherein the active power value is corrected by comparing a received active power value with a measured active power value measured from the power signal; and
performing the charging/discharging based on the determined charging/discharging schedule at the selected charging station.

11. An electric vehicle, comprising:
a battery;
a global positioning system (GPS) receiver for measuring a current location;
a vehicle communication terminal in communication comprising an external device via a network;
an electric vehicle charging controller configured to control charging and discharging of the battery; and
a wireless and wired charging/discharging device comprising a charging cable, an electromagnetic induction or resonance scheme, and a wireless/wired power transmitter and receiver for the charging or the discharging of the battery in association with a charging station, the charging/discharging device being controlled by the electric vehicle charging controller,
wherein the electric vehicle charging controller is configured to perform operations comprising:
generating map information comprising a charging/discharging fee rate policy for each mapped charging station and registering the generated map information in a navigation system of the electric vehicle;
identifying one or more charging stations capable of performing charging/discharging operations corresponding to a current location of the electric vehicle based on the generated map information;
extracting a charging/discharging fee rate policy mapped to each of the identified one or more charging stations;
selecting a charging station leading to an optimal fee based on the extracted charging/discharging fee rate policy;
determining a charging/discharging schedule based on a charging/discharging fee rate policy of the selected charging station;
moving to the selected charging station based on the determined charging/discharging schedule and receiving, from the selected charging station, information on system parameters corresponding to an area code corresponding to a current location;
correcting the system parameters based on a power signal received from the selected charging station,
wherein the system parameters include an operating frequency value and an active power value,
wherein the operating frequency value is corrected by comparing a received operating frequency value with a measured operating frequency value measured from the power signal, and
wherein the active power value is corrected by comparing a received active power value with a measured active power value measured from the power signal; and
performing the charging/discharging based on the determined charging/discharging schedule at the selected charging station.

12. The electric vehicle of claim 11, wherein the operations further comprise:
determining an available charging/discharging time period; and
determining a charging station leading to an optimal fee based on a charging/discharging fee rate of each of the identified one or more charging stations of the available charging/discharging time period.

13. The electric vehicle of claim 11, wherein the operations further comprise:
correcting the system parameters based on a measurement result for the power signal received from the selected charging station,
wherein the system parameters are received from a server connected via the selected charging station or a network.

14. The electric vehicle of claim 13, wherein the system parameters include an operating frequency value and an active power value,
wherein the operations further comprise:
correcting the operating frequency value by comparing a received operating frequency value with a measured operating frequency value measured from the power signal; and
correcting the active power value by comparing a received active power value with a measured active power value measured from the power signal.

15. The electric vehicle of claim 11, wherein the operations further comprise:
determining a discharging time period leading to a maximum fee based on the charging/discharging fee rate policy of the selected charging station;
determining a charging time period leading to a minimum fee based on the charging/discharging fee rate policy of the selected charging station; and generating a charging/discharging scheduling table based on the determined discharging time period and the determined charging time period.

16. The electric vehicle of claim 15, wherein the charging/discharging scheduling table comprises one or more of:
- a fee rate field indicating a fee rate for each time period;
- a mode field indicating a time period to be in a discharging mode, a discharging start time period, a time period to be in a charging mode, and a charging start time period;
- a charging/discharging flag field indicating whether an actual discharging or an actual charging has been performed in a corresponding time period; and
- a deposit and withdrawal state field indicating whether deposit or withdrawal of a fee to or from a user account has been completed for the actual discharging or the actual charging performed in the corresponding time period.

17. The electric vehicle of claim 15, wherein the charging/discharging fee rate policy is dynamically updated based on power consumption statistics information for the determined charging time period and the determined discharging time period of the selected charging station.

18. The electric vehicle of claim 11, wherein the determining the charging/discharging schedule further comprises basing the determining on one or more of a future travel plan set by a user, a pre-analyzed travel pattern, and a current battery charged state.

19. The electric vehicle of claim 18, wherein the operations further comprise:
- transmitting vehicle state information to a server via the vehicle communication terminal; and
- receiving the pre-analyzed travel pattern from the server, wherein the server learns the pre-analyzed travel pattern in advance based on the vehicle state information,
- wherein the vehicle state information comprises one or more of location information of the electric vehicle, information on a travel path set in the navigation system, information on the current battery charged state, information on a travel speed, information on a road where the electric vehicle is traveling, information on battery power consumed per unit time, and information on a preferred power grid and/or a preferred charging station of the user.

* * * * *